(12) United States Patent
Iizuka et al.

(10) Patent No.: US 6,175,406 B1
(45) Date of Patent: *Jan. 16, 2001

(54) FILM HOLDER AND IMAGE READING APPARATUS

(75) Inventors: Toshimi Iizuka, Yokohama; Masahito Natsume, Matsudo; Kenji Miyauchi, Tokyo; Yoshinari Onda, Kawasaki; Toshiki Ishino, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/964,865

(22) Filed: Nov. 5, 1997

(30) Foreign Application Priority Data

| Nov. 8, 1996 | (JP) | .................................................... 8-296468 |
| Feb. 17, 1997 | (JP) | .................................................... 9-031998 |
| Feb. 26, 1997 | (JP) | .................................................... 9-042182 |

(51) Int. Cl.[7] ............................ G03B 27/52; G03B 27/62
(52) U.S. Cl. .............................................. 355/75; 355/40
(58) Field of Search .................................. 355/27–29, 40, 355/41, 50, 75; 358/471, 487, 296; 348/96, 110, 112; 396/517

(56) References Cited

U.S. PATENT DOCUMENTS

| 4,682,042 | * | 7/1987 | Igarashi | 250/578 |
| 5,371,614 | * | 12/1994 | Ito | 358/487 |
| 5,420,700 | * | 5/1995 | Maeda et al. | 358/496 |
| 5,493,473 | * | 2/1996 | Yanagi | 361/695 |
| 5,519,878 | * | 5/1996 | Fujii | 361/749 |
| 5,635,973 | * | 6/1997 | Yamada | 347/171 |
| 5,646,746 | * | 7/1997 | Tazawa et al. | 358/471 |
| 5,696,668 | * | 12/1997 | Zenitani et al. | 361/802 |
| 5,754,314 | * | 5/1998 | Araki et al. | 358/487 |
| 5,790,187 | * | 8/1998 | Suzuki | 348/96 |
| 5,808,757 | * | 9/1998 | Ikeda | 358/498 |

* cited by examiner

Primary Examiner—Russell Adams
Assistant Examiner—Hung Henry Nguyen
(74) Attorney, Agent, or Firm—Morgan & Finnegan, L.L.P.

(57) ABSTRACT

An image reading apparatus includes a carriage for holding a film holder holding a film, a motor for moving the carriage, and a housing for holding the carriage and the motor. While the motor moves the carriage, a first portion of the carriage is positioned by being slidably clamped by the housing, and a second portion which is in the opposite side of the first portion of the carriage is slidably positioned by a guide shaft. An image reading apparatus includes an image sensor for sensing an image from an original, a conveyor for conveying the original, a first board on which an image processing circuit for performing predetermined processing for an image signal output from the image sensor is mounted, and a second board on which a power supply circuit for supplying power to the image processing circuit is mounted. The first and second boards are arranged to be parallel to each other, and the conveyor means conveys the original to cause the original to pass through a space enclosed with the first board and the second board. An inlet is formed in a lower part of a space enclosed with the first board and the second board, and an outlet is formed in an upper part of the space. The conveyor conveys the original while keeping the original parallel to the first or second board. The original is translucent.

13 Claims, 32 Drawing Sheets

FILM HOLDER AND IMAGE READING APPARATUS

BACKGROUND OF THE INVENTION

1. Field of the Invention

The present invention relates to a film holder for holding a film and an image reading apparatus for reading an image on the film held by the film holder.

2. Description of Related Art

When an image on a film is to be read by a conventional film scanner, the film is held in a film holder, and the film holder is inserted into the scanner, thereby reading the image on the film. In many cases, positive films are held in the slide mounts as shown in FIG. 20. Such a film is therefore directly inserted into a film scanner. For this film scanner, high image quality, high resolution, and the like are required as the performance specifications of the product. For this reason, to meet the image input precision (movement precision) requirement and the like, a film holder carriage held by two guide shafts is slid thereon to read an image.

FIG. 20 shows a positive mount film 100 and the internal holding structure of a film scanner. When the positive mount film 100 is held in the scanner, the film is held/fixed on a carriage 101 between holder press members 102a and 102b. The driving force from a driving unit 105 is transmitted through driving force transmission units 104a and 104b to move the carriage 101 in a direction parallel to guide shafts 103 so as to move the film illuminated by a light source relative to a one-dimensional CCD line sensor. With this operation, a two-dimensional image is read.

The conventional film scanner uses a vibrator such as a motor. A high-strength, high-rigidity housing for the motor is formed by bending metal plates or by casting and secondary machining. This housing is used to hold the motor for driving the carriage on which the film holder for holding a film is mounted.

A conventional electronic device (e.g., a film scanner) having a SCSI (Small Computer System Interface) (I/F) generally has at least two SCSI connector terminals to allow connection to another SCSI I/F-equipped device through a SCSI cable.

FIG. 31 shows such a SCSI connector and the fitting portion of a SCSI cable connected thereto. Referring to FIG. 31, reference numeral 301 denotes a SCSI connector which is fitted to a fitting portion 302 of a SCSI cable to allow input and output of image signals and the like; and 29, a printed board. In this case, the surface of the printed board 29 on which the SCSI connector 301 is mounted is defined as an surface A, and the surface opposite to the surface A is defined as a surface B. Reference numeral 304 denotes an electronic part which is the tallest part on the surface B of the printed board 29.

Referring to FIG. 31, reference symbol H1 denotes the maximum height of the SCSI connector 301; H2, the maximum height of the fitting portion 302 of the SCSI cable; H3, the maximum height of the electronic part 304; S1, the jutted size of the fitting portion 302 with respect to the SCSI connector 301 when they are fitted to each other; and t1, the thickness of the printed board 29.

When a plurality of SCSI connectors are to be mounted on such a conventional SCSI I/F-equipped device, the connectors are arranged side by side on one surface of a printed board placed in the device due to mounting limitations. This structure will be described below.

FIG. 32 shows an example of how two SCSI connectors 300 and 301 are arranged, on the surface A of the printed board 29, side by side in the direction of width. Letting W1 be the outside width of each SCSI connector, a width w of the area occupied by the two SCSI connectors is given by:

$$w = W1 + W1 \tag{1}$$

That is, an area having a size at least twice the width W1 of one SCSI connector is required.

FIG. 33 shows an example of the two SCSI connectors 300 and 301 that are stacked on the surface A of the printed board 29 in the direction of height. In this case, a width w2 of the area occupied by the two connectors is given by $$w2 = W1 \tag{2}$$

That is, the width w2 corresponds to the width of one SCSI connector. From equations (1) and (2), we have $$w > w2 \tag{3}$$

Obviously, the layout constituted by the two connectors stacked on each other in the direction of height in FIG. 33 is more compact in the direction of width than that in FIG. 32.

In general, a 135-type negative strip film is cut in units of six frames. When six-frame images are to be continuously read with the scanner, each frame to be read must be positioned with respect to the film holder for each read operation. It therefore takes much time and labor to read the images. According to some improved scanners, three frames are continuously read first, and then the film holder is rotated through 180° to read the three remaining frames. This scheme, however, requires a cumbersome operation of reversing the film holder halfway in image reading.

If the film to be read is curled, it is difficult to hold the film on the film holder. In addition, the film may be soiled. If the film is held in a wrong direction, a vertically or horizontally reversed image is read. The film must therefore be set again. Once the film is held on the holder, a positional offset cannot be corrected without contaminating the film with fingerprints or the like. Furthermore, after the film holder is attached to the film scanner, the user cannot check the position of a frame before prescanning. Since high-precision parts are required for a scanner to read an image with high quality, the cost and the number of steps inevitably increase.

If a power supply circuit for supply power to the overall device and an image processing circuit for processing a read image signal are arranged nearby, the noise generated by the power supply circuit adversely affects the image processing circuit, resulting in poor image quality. In some devices, a power switch is directly mounted on a power supply board to be located on the rear side of the device body so as to ensure high resistance to noise. In this case, however, when the operator is to turn on the power supply of the device body, he/she must fumble for the power switch on the rear side of the device body or must look therein, resulting in poor operability.

Since the heat generated by the power supply circuit may adversely affect the image processing circuit, the two circuits are formed on different boards, and the power supply board and the image processing board are arranged parallel to be spaced apart from each other. Alternatively, the structural members are formed by die casting or a cooling fan is used. The addition of such parts, however, leads to an increase in cost. In addition, since the film tends to curl or discolor with an increase in temperature, the space in which the film is inserted is spaced apart from the heating members such as the power supply to ensure the movement area for the film and reduce the influence of heat, and to prevent the film from being damaged when the film holder comes into contact with the board. This structure, however, poses a problem in realizing a compact device.

The following drawbacks are posed in the conventional scanner.

When metal plate members having undergone a bending process are to be used, the degree of freedom in shape is low. In this case, since a housing must be formed by combining a plurality of members, it is difficult to attain high precision. In addition, since the housing has many flat portions, the precision may deteriorate due to the warpage of members. When a housing is to be formed by die casting and secondary machining, a high process cost is required, resulting in an increase in the cost of each member.

It is an object of the present invention to provide an apparatus which can satisfy both the precision and strength requirements for the housing. It is also an object of the present invention to reduce the vibration and noise generated by the motor.

The following problems are posed in the conventional SCSI I/F-equipped device.

If a plurality of SCSI connectors are arranged, side by side in the direction of width, on the same mounting surface of the printed board, as shown in FIG. 32, since a large space is required in the direction of width of the printed board, the overall apparatus size increases in the direction of width, although the height hi can be suppressed.

If the SCSI connectors are stacked on the mounting surface of the printed board in the direction of height, as shown in FIG. 33, a sufficient space for storing the SCSI connectors 300 and 301, the printed board 29, and the electronic part 304 is required in the direction of height, although the width of the printed board can be decreased. In the structure having the SCSI connectors stacked on each other, SCSI cables may be fitted to the SCSI connectors 300 and 301 at once in actual operation of the device. In this case, in consideration of the size S1 of each overhang of the fitting portion 302, the distance between the two SCSI connectors must be set to be at least twice the size S1 of the SCSI cable. That is, as shown in FIG. 33, the height h2 given by the following equation is required:

$$h2 = H1 \times 2 + S1 \times 2 + t1 + H3 \qquad (4)$$

SUMMARY OF THE INVENTION

It is an object of the present invention to provide a film holder which can easily hold the film to be read, and allows a plurality of frames on the held film to be consecutively read.

It is another object of the present invention to decrease the number of parts of an image reading apparatus, reduce its size, and improve the degree of freedom in design.

It is still another object of the present invention to improve the reliability of the power supply of an image reading apparatus and arithmetic processing performed therein.

It is still another object of the present invention to provide an inexpensive, high-performance vibration absorbing device.

It is still another object of the present invention to realize reductions in the outer dimensions of an electronic device and an improvement in reliability thereof.

In order to achieve the above objects, according to an embodiment of the present invention, there is provided a film holder detachably mounted on an image reading apparatus, comprising: a first holder for holding a film, the holder having a plurality of opening portions corresponding to images on the film and a retreat portion; and a second holder for holding the first holder to be movable in a longitudinal direction, the second holder having at least one opening portion to which an image on the film is exposed while the opening portion overlaps one of the opening portions of the first holder, wherein the first holder is opened/closed in the longitudinal direction while the second holder is placed on the retreat portion. With this arrangement, a film can be easily held in the film holder. In addition, a plurality of frames on the film held in the film holder can be consecutively read.

According to another embodiment of the present invention, there is provided an image reading apparatus comprising: a carriage for holding a film holder holding a film; moving means for moving the carriage; and a housing for holding the carriage and the moving means, wherein while the moving means moves the carriage, one portion of the carriage is positioned by being slidably clamped by the housing, and the other portion of the carriage is slidably positioned by a guide shaft. With this arrangement, the number of parts of the image reading apparatus can be decreased, thereby reducing the size of the apparatus and improving the degree of freedom in design.

According to still another embodiment of the present invention, there is provided an image reading apparatus comprising: image sensing means for sensing an image from an original; a first board on which an image processing circuit for performing predetermined processing for an image signal output from the image sensing means is mounted; and a second board on which a power supply circuit for supplying power to the image processing circuit is mounted, wherein the first and second boards are arranged to be parallel to each other, and a metal plate is placed between the first and second boards. With this arrangement, the heat dissipation efficiency of the power supply board and the noise shield in the image reading apparatus improve to make the image processing circuit less susceptible to the adverse influence of the heat and noise generated by the power supply. As a result, the reliability of the power supply and arithmetic processing can be improved. In addition, the influence of heat on an original can be reduced.

According to still another embodiment of the present invention, there is provided a vibration absorbing device for absorbing a vibration from a vibrator comprising: a housing for fixing the vibrator, wherein a plurality of frame structures are provided for the housing, and spaces enclosed with the plurality of frame structures have different capacities. With this arrangement, a less costly, high-precision vibration absorbing device is provided. Therefore, the influence of the transmission of the vibrations generated by the vibrator and drive noise due to resonance of the housing can be reduced.

According to still another embodiment of the present invention, there is provided an electronic device comprising: a first SCSI connector; a second SCSI connector; and a printed board for performing predetermined processing for a signal input/output through the first or second SCSI connector, wherein the first SCSI connector is mounted on a first surface of said printed board, and the second SCSI connector is mounted on a second surface of the printed board which is different from the first surface. With this arrangement, the outer dimensions of the electronic device can be reduced, and its reliability can be improved.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

[First Embodiment]

Figure 1:
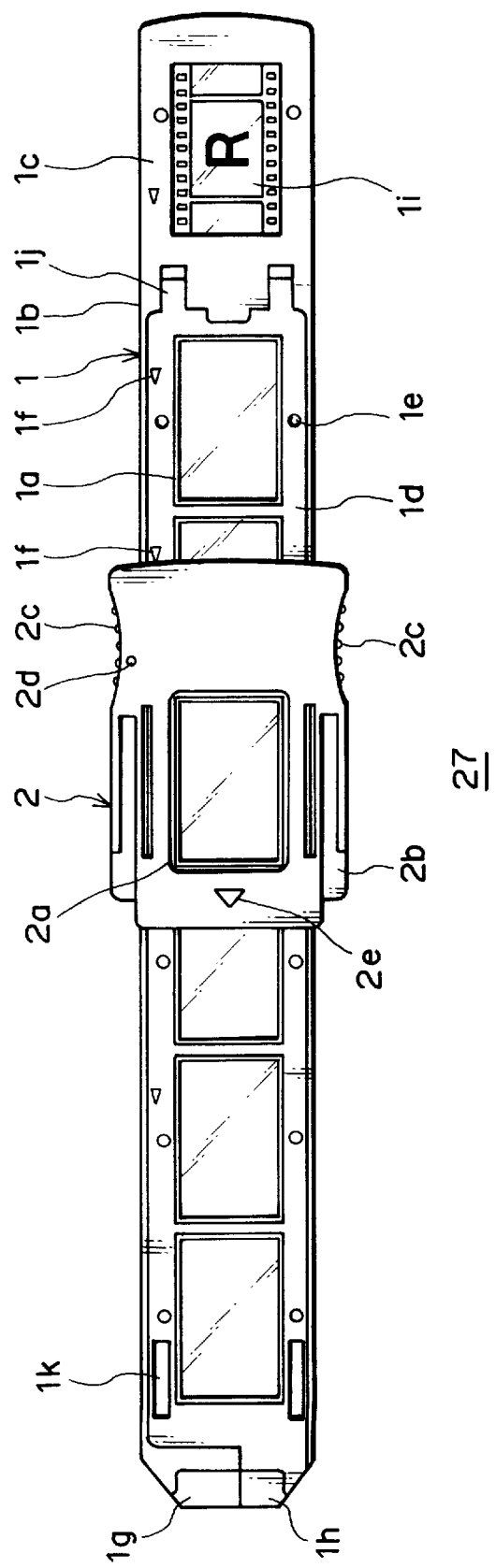
FIG. 1 is a plan view showing a film holder according to the first embodiment of the present invention.

FIG. 1 shows a film holder according to the first embodiment of the present invention.

As shown in FIG. 1, a film slide holder 27 of this embodiment is constituted by a film holder 1 (first holder) for holding a film, and a holder slider 2 (second holder) for holding the film holder 1 to be slidable in the longitudinal direction. The film holder 1 includes a film base 1a, a retreat portion 1c, a film cover 1d, click grooves 1e, index 1f, engaging portions 1g and 1h, a film direction display portion 1i, and a hinge 1j. The holder slider 2 includes an opening portion 2a, a mounting portion 2b which is used to mount the holder slider 2 on another device such as a film scanner, finger rests 2c for allowing a user to hold the holder slider 2 with his/her fingers, a position check index 2d used when the holder slider 2 is mounted on another device, and an arrow mark 2e for indicating the direction in which the holder slider 2 is mounted on another device.

Figure 2:
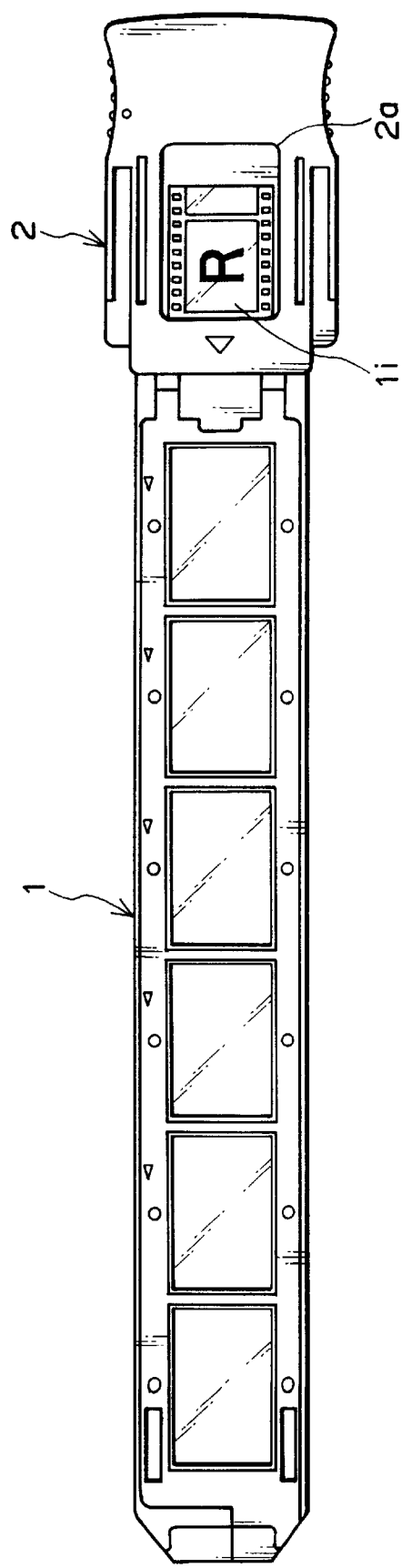
FIG. 2 is a plan view showing the film holder according to the first embodiment.
Figure 3:
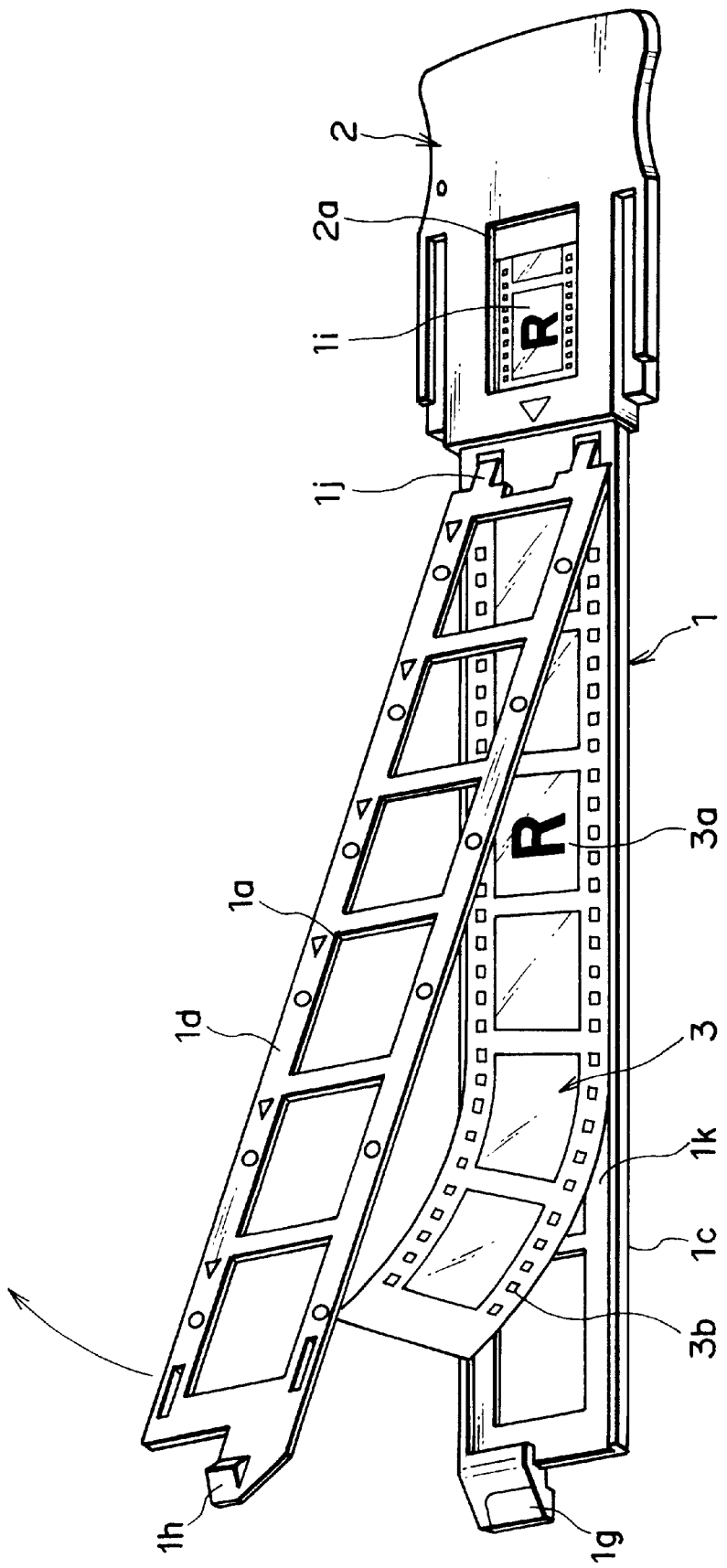
FIG. 3 is a perspective view showing the film holder according to the first embodiment.

FIG. 2 shows a state in which the holder slider 2 in FIG. 1 is moved to the retreat portion 1c of the film holder 1. FIG. 3 shows a state in which the film holder 1 is opened in the state shown in FIG. 2 before a film 3 is held and the film cover id is closed. The film 3 has six frames 3a and perforations 3b in the upper and lower ends of each frame. Reference numeral 1k denotes a film storing portion formed in the film base 1a.

When the film 3 is to be set on the film holder 1, the holder slider 2 is moved to the retreat portion 1c of the film holder 1, as shown in FIG. 2. The film cover 1d is then rotated about the hinge 1j as the axis of rotation to be opened wide, and the film 3 is inserted into the film storing portion 1k of the film cover 1d, as shown in FIG. 3. Thereafter, the film cover 1d is closed, and the engaging portions 1g and 1h are engaged with each other. The user can insert the film 3 into the film holder 1 in this manner while checking the vertical position and upper/lower surface of the film 3 such that the direction of an image on the film 3 coincides with the film direction display portion li seen through the opening portion 2a of the holder slider 2, thereby preventing a needless operation, i.e., setting the film again upon recognizing that the film is inserted in a wrong direction after image reading is started.

Subsequently, as shown in FIG. 1, the image to be read first is selected, and the opening portion 2a of the holder slider 2 is adjusted to the corresponding frame. In this case, the click grooves 1e are engaged with projections (not shown) of the holder slider 2 at the position where one of a plurality of opening portions 1a of the film holder 1 coincides with the opening portion 2a of the holder slider 2, thereby reliably positioning the film. These click grooves 1e and projections serve as position detection means. In this state, the index If marked on the film holder 1 is positioned to the rear end of the holder slider 2. With this indicator, when the film holder 1 is mounted on the film scanner (to be described later) to read an image, the user can check whether the image is offset from the click position, even if the image cannot be seen from the outside of the film scanner. As described above, all the frames of the film 3 can be continuously read while the film holder 1 is attached to the film scanner.

Figure 4:
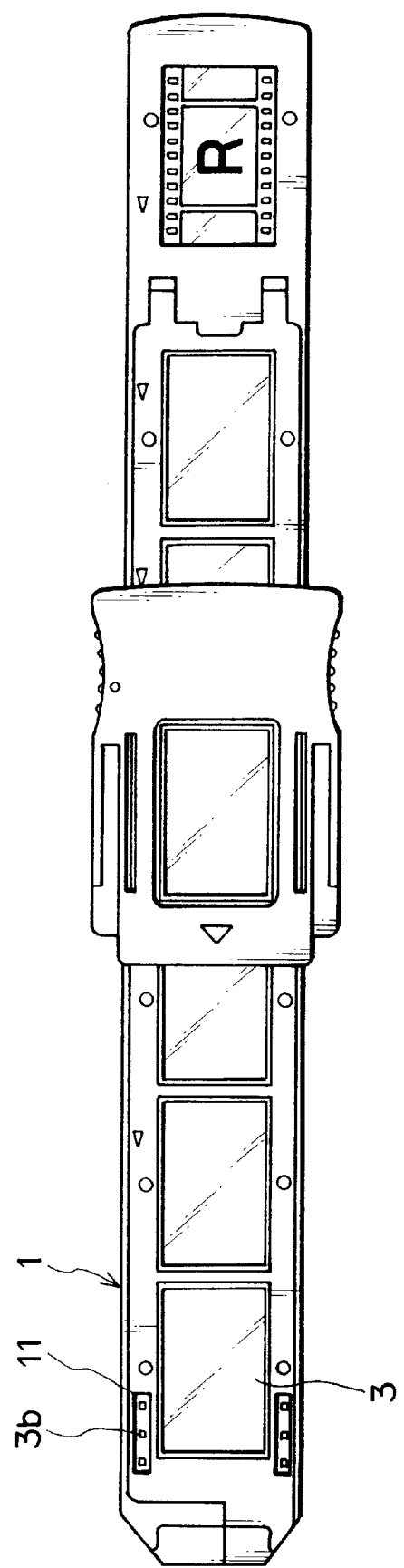
FIG. 4 is a plan view showing the film holder according to the first embodiment.

FIG. 4 shows a state in which the film 3 is held by the film holder 1.

As shown in FIG. 4, reference numeral 11 denotes an opening portion of the film holder 1. The perforations 3b of the film 3 can be seen through the opening portions 11. With the opening portions 11, even if the position of the film 3 held in the film holder 1 is slightly offset, the user can easily correct the positional offset by hooking the perforation 3b, which can be seen through the opening portions 11 without opening the film cover Id, with the tip of a pen or the like.

Figure 5:
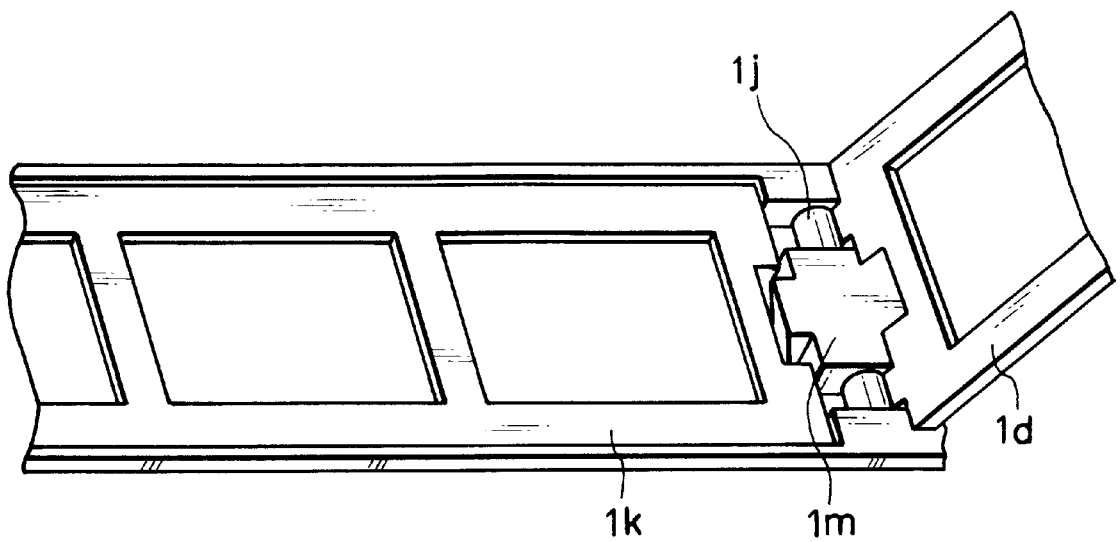
FIG. 5 is a perspective view showing the film holder according to the first embodiment.
Figure 6:
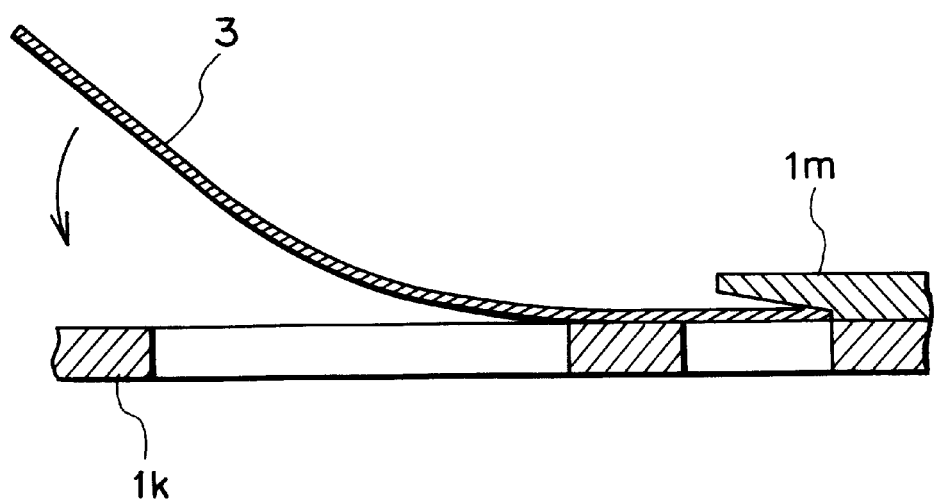
FIG. 6 is a view showing the film holder according to the first embodiment.

FIG. 5 is a perspective view showing the main part of the film holder. FIG. 6 is a sectional view of the main part in FIG. 5.

FIGS. 5 and 6 show the film storing portion 1k, a film lock portion 1m, the film cover 1d, and the hinge 1j. If, for example, the user tries to hold a curled film in the film holder, he/she has difficulty in holding the film and often soils the film with his/her fingerprints or the like. This embodiment therefore includes the lock portion 1m as a member for preventing the film from loosening. With this lock portion 1m, the user can easily hold a curled film in the film holder in the following manner without soiling the film with his/her fingers. First of all, the user locks the distal end of the film to the lock portion 1m. The user then sets the film in the film storing portion 1k while stretching the curled film, and closes the film cover 1d.

Figure 7:
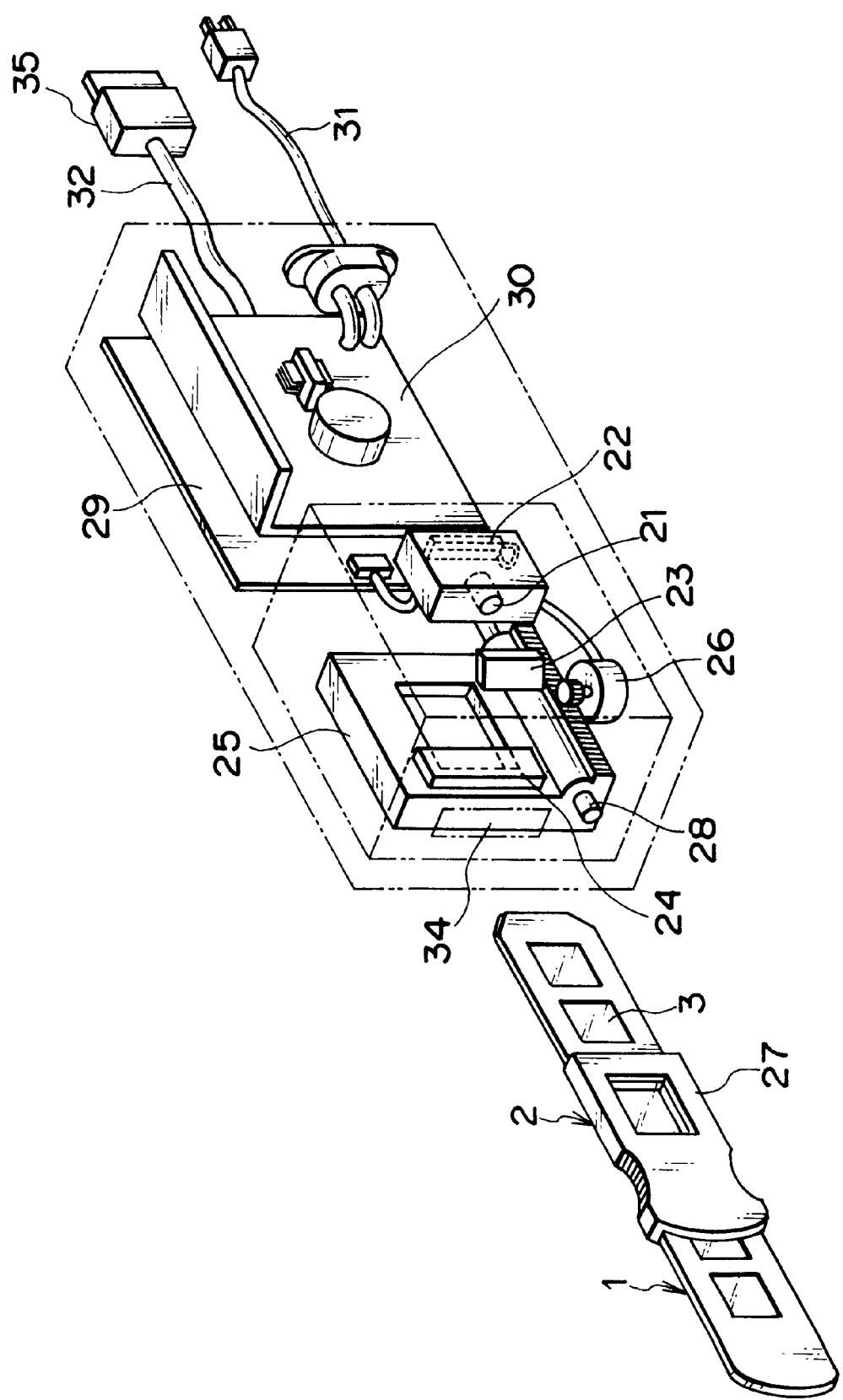
FIG. 7 is a perspective view showing a film scanner according to the first embodiment.
Figure 8:
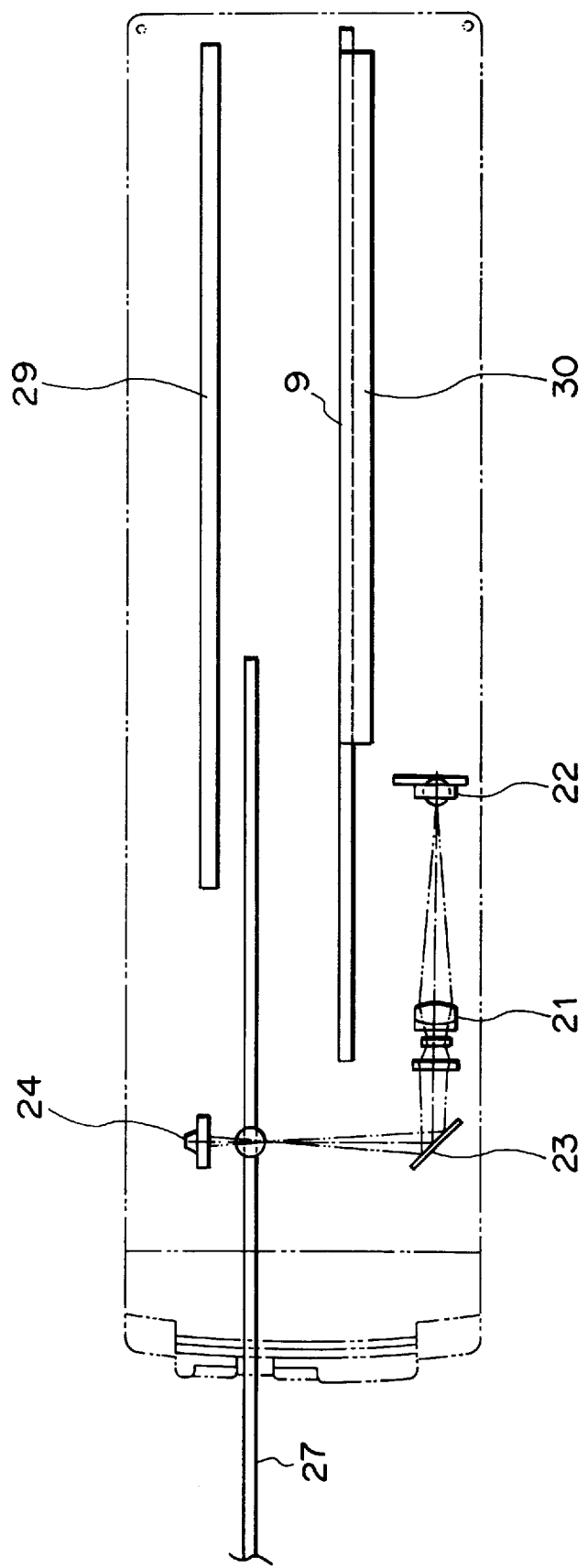
FIG. 8 is a top view showing the film scanner according to the first embodiment.

FIG. 7 is a schematic perspective view showing the film scanner for reading an image on the film held by the film holder in FIG. 1. FIG. 8 is a top view of the scanner in FIG. 7.

Referring to FIG. 7, reference numeral 21 denotes a lens serving as an imaging optical system; 22, a line CCD (charge coupled device) sensor placed on the focal plane of the lens 21 to perform photoelectric conversion; 23, a mirror for bending the optical axis of the lens 21 through 90°; and 24, a cold cathode-ray tube serving as an illumination means.

Figure 9A:
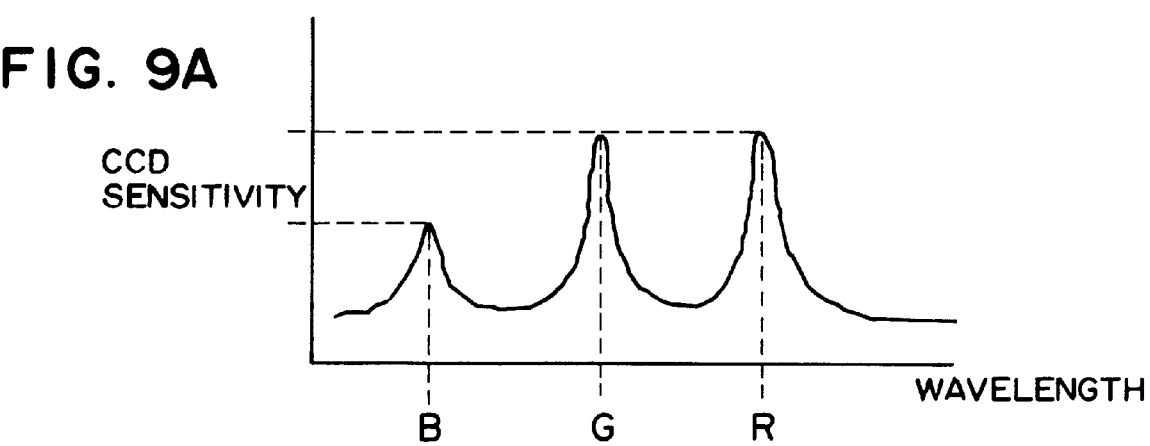
FIGS. 9A to 9C are graphs showing the light source characteristics in the first embodiment.
Figure 9B:
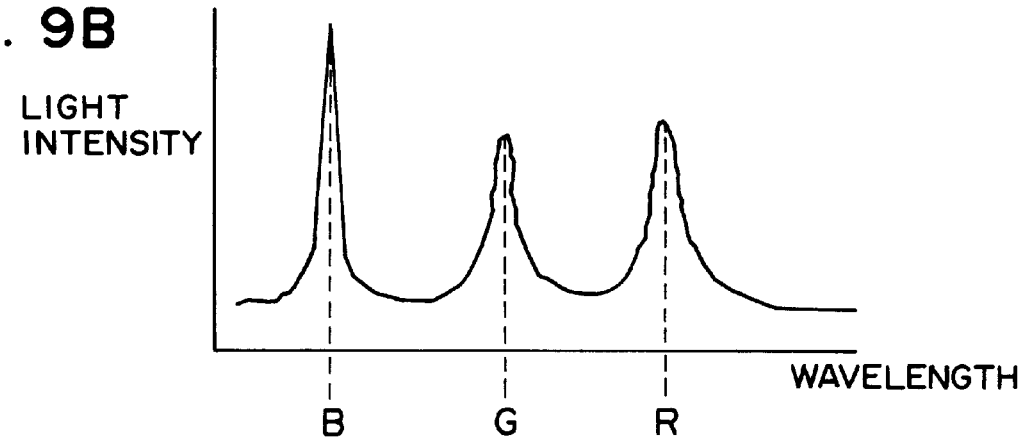
Figure 9C:
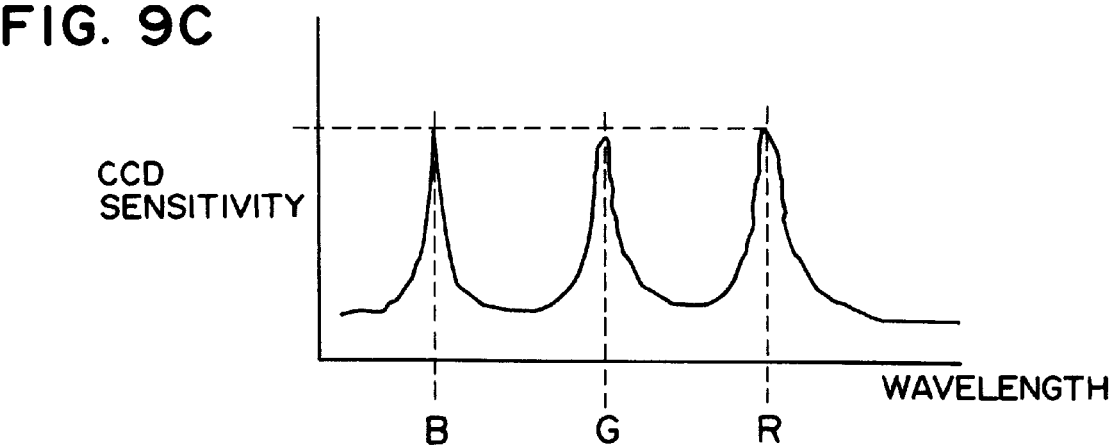

The characteristics of the cold cathode-ray tube used for the film scanner of this embodiment will be described below. FIG. 9A shows the spectral distribution of the sensitivity of the CCD. The sensitivity of the CCD is low in the blue region. If, therefore, ordinary white light is used, the color balance of the reproduced image deteriorates. For this reason, the sensitivity in the blue region in the spectral distribution of the cold cathode-ray tube 24 is intensified, as shown in FIG. 9B, to almost equalize the peaks of the sensitivity of the CCD which correspond to the three primary colors, i.e., R, G, and B, as shown in FIG. 9C. With this setting, the color quality of the reproduced image can be improved.

Reference numeral 25 denotes a film holder carriage body for holding the film holder 1 to be movable across the optical axis of the lens 21; 26, a stepping motor serving as a moving means for moving the film holder carriage body 25; 27, a film slide holder which is identical to the one described with reference to FIGS. 1 to 6 and is inserted into the film holder carriage body 25 to read an image; 28, a guide shaft for guiding the film holder carriage body 25 in the moving direction; 29, an image processing board (first board) for performing overall control of the film scanner and signal processing; 30, a power supply board (second board) for supplying power from an input power supply to the apparatus; 31, a power cable which is connected to an external power supply to supply power to the film scanner; and 32, a communication cable for outputting an image signal to an external device such as a personal computer or receiving a command and the like from an external device. A connector 35 such as a SCSI is connected to the communication cable 32.

The operation of reading images on a film will be described next. The position of the holder slider 2 is adjusted to one of the frames of the film 3 which is to be read first, and the film slide holder 27 is inserted into the film scanner through an insertion port 34. An AC current has been supplied to the power supply board 30 through the power cable 31 so the power supply board 30 supplies necessary power to the printed board 29.

When image reading is started, the cold cathode-ray tube 24 is turned on to illuminate an image on the film 3. The light transmitted through the film 3 is deflected through 90° by the mirror 23 and is formed into an image on the CCD sensor 22 through the lens 21. The image is then photoelectrically converted into an image signal by the CCD sensor 22 and subjected to predetermined processing on the printed board 29. As a result, a one-line image signal is output to the external device through the communication cable 32. Thereafter, the film holder carriage body 25 is moved by the stepping motor 26 by a distance corresponding to one line to read the image on the next line. By repeating the above operation, the image corresponding to one frame of the film is read as an image signal, which is output to the external device.

In this case, the power supply board 30 and the printed board 29 are formed as separate parts to prevent the noise generated by the power supply board 30 from affecting the image processing on the printed board 29. In addition, the size of the scanner can be reduced by separately mounting these boards in the film scanner body. To block electromagnetic noise due to discharge from the power supply board 30, a metal bracket 9 is attached to the power supply board 30. By grounding the bracket 9, the influence of radiant power supply noise from the power supply board 30 on the printed board 29 can be greatly reduced. As a result, the reliability and stability of image processing improve.

The film scanner 10 will be described in detail next with reference to FIGS. 10 to 13.

Figure 10:
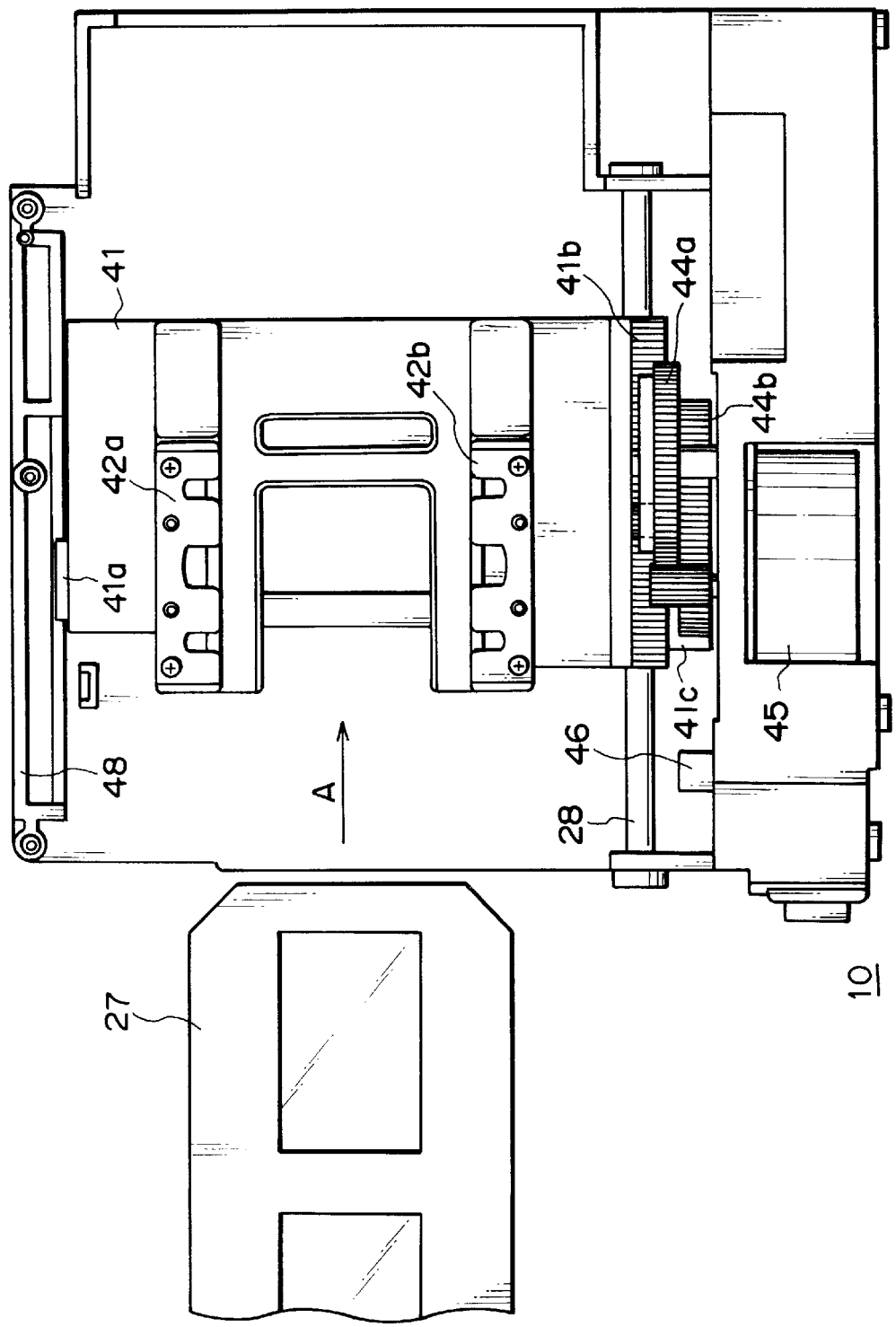
FIG. 10 is a sectional view showing the film scanner according to the first embodiment.
Figure 11:
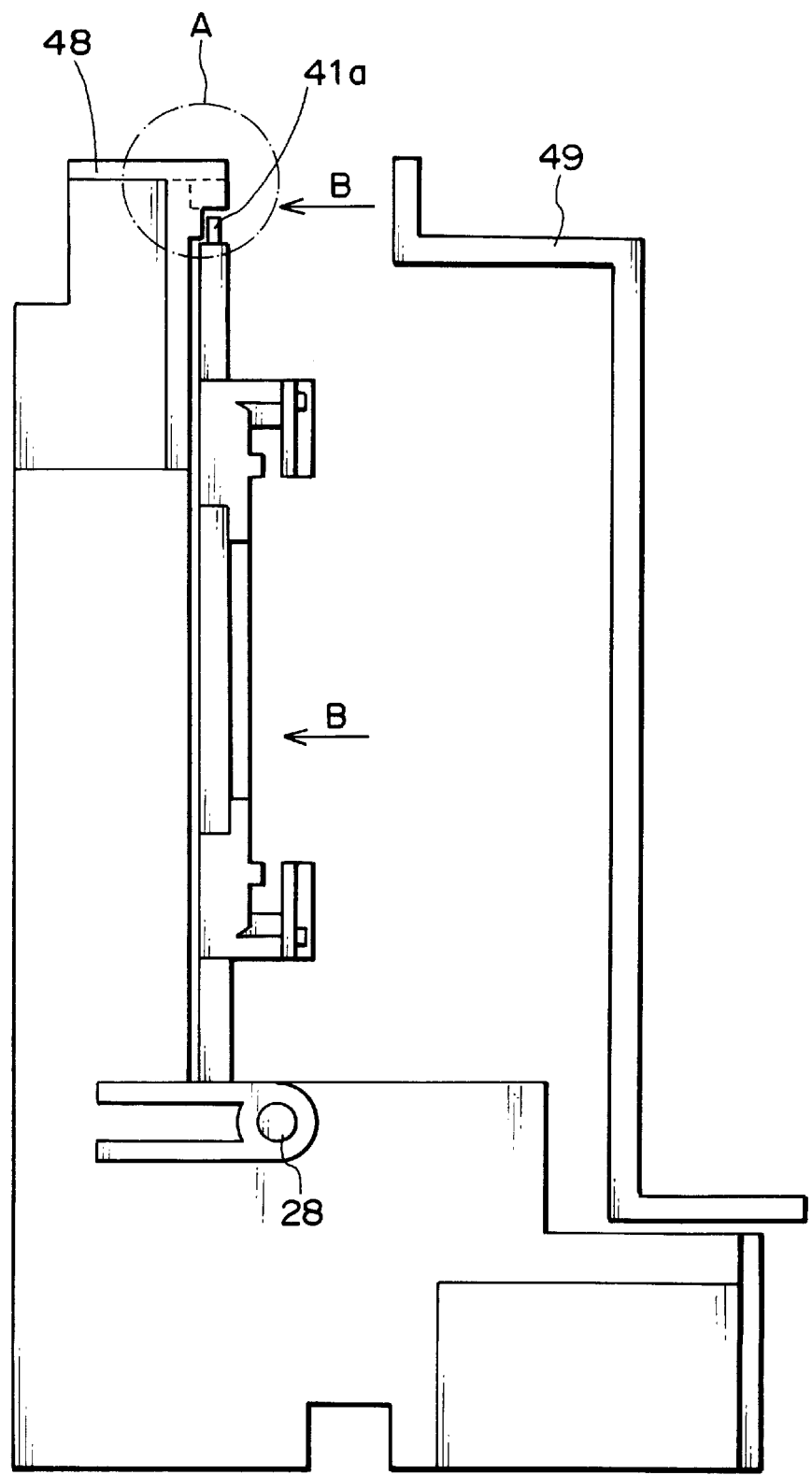
FIG. 11 is a sectional view showing the film scanner according to the first embodiment.
Figure 12:
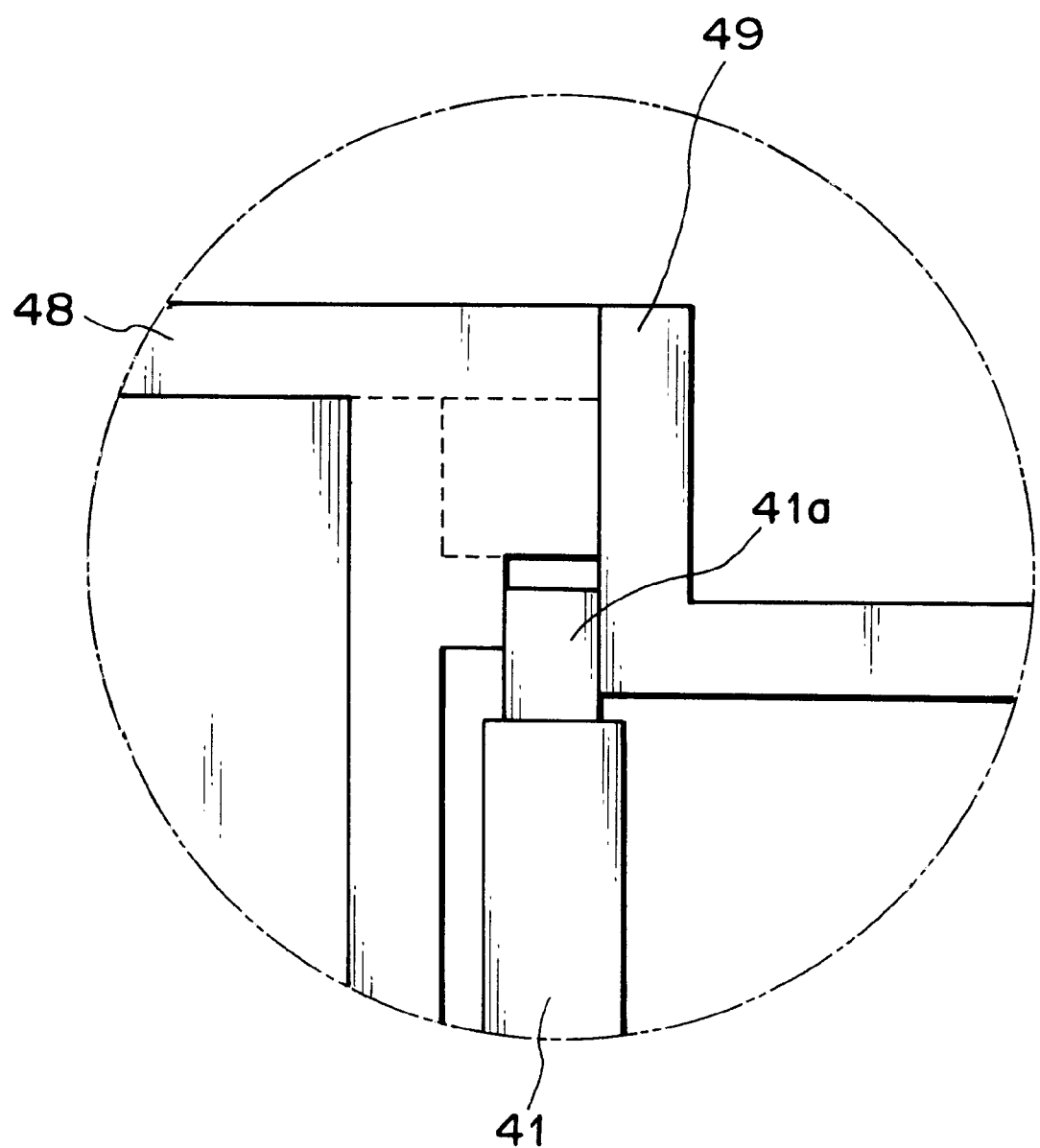
FIG. 12 is an enlarged view of a portion of the film scanner according to the first embodiment.
Figure 13:
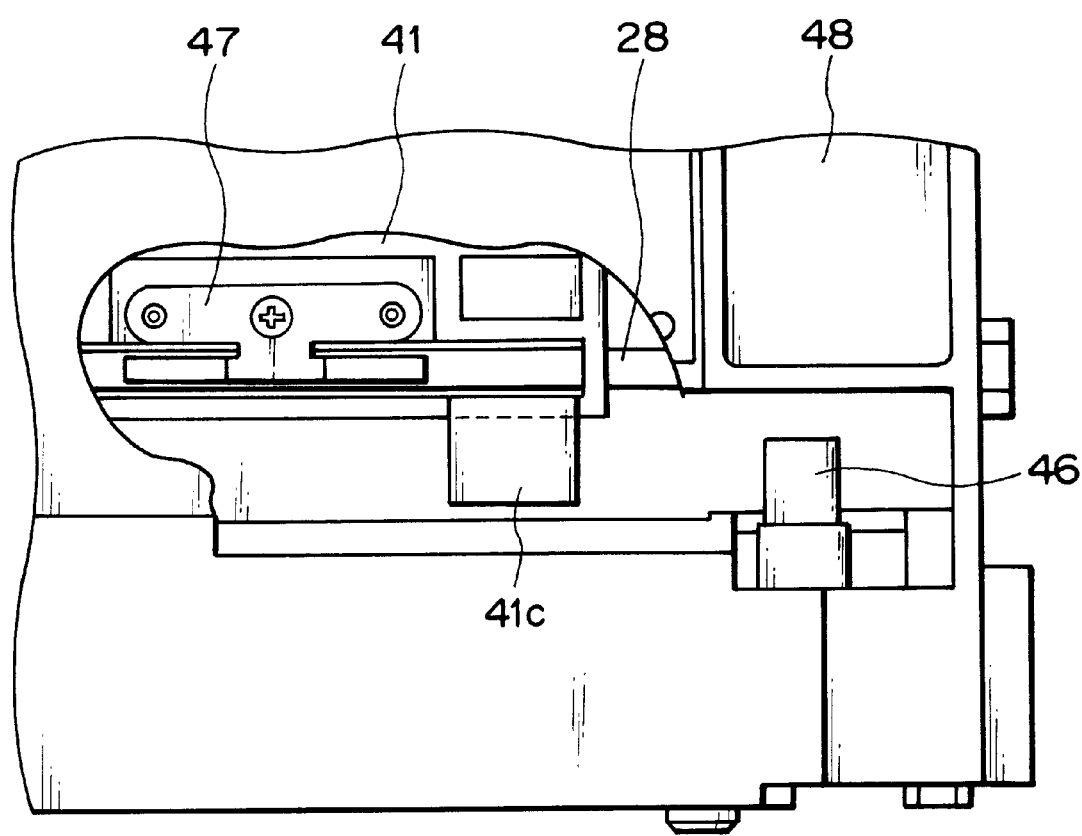
FIG. 13 is an enlarged view of a portion of the film scanner according to the first embodiment.

FIG. 10 is a front view showing a portion near the film holder carriage in the film scanner. FIG. 11 is a side view of the film scanner in FIG. 10. FIG. 12 is an enlarged view of a portion A in FIG. 11. FIG. 13 is an enlarged view of a portion near a position detection unit (to be described later).

Referring to FIGS. 10 to 13, reference numeral 41 denotes a film holder carriage for holding the film slide holder 27 which holds a film developed in one of various formats, and moving the holder in a predetermined scanning direction when a film image is to be input; and 42a and 42b, film holder press members fixed to the film holder carriage 41 with screws or the like.

The guide shaft 28 holds the film holder carriage 41 and guides it in the sub-scanning direction. Reference numerals 44a and 44b denote driving force transmission mechanisms for moving the film holder carriage 41 in the scanning direction; and 45, a driving unit using a stepping motor for moving the film holder carriage 41 in the scanning direction.

Reference numeral 46 denotes a position detection unit (position detection means) for detecting the position of the film holder carriage 41; 47, a biasing leaf spring serving as a biasing means for reducing the fitting backlash between the film holder carriage 41 and the guide shaft 28; 48, a first housing for holding the film holder carriage 41, the guide shaft 28, the driving force transmission mechanisms 44a and 44b, the driving unit 45, and the position detection unit 46; and 49, a second housing which is fitted to the second housing 48 in a substantially box-like form.

The film slide holder 27 is inserted into the insertion port in the direction indicated by an arrow A to be attached to the film scanner 10.

The film holder carriage 41 has a driving force transmission portion 41b constituted by a pinion gear and the like. When the driving unit 45 drives the driving force transmission mechanisms 44a and 44b, the driving force is transmitted to the rack or the like of the film holder carriage 41. As a result, the film holder carriage 41 is moved. As shown in FIG. 11, an upper end portion 41a of the film holder carriage 41 is slidably held between the first and second housings 48 and 49 to serve as a guide for the film holder carriage 41. A lower end portion 41b of the film holder carriage 41 has the biasing leaf spring 47 fixed to the film holder carriage 41 with screws or the like so as to bias the fitting backlash between the film holder carriage 41 and the guide shaft 28 in one direction.

As shown in FIG. 13, the position detection unit 46 fixed to the second housing 48 with screws or the like is constituted by a reflective photosensor and the like. The position detection unit 46 is turned on when light is blocked by a lower projection 41c of the film holder carriage 41, and is turned off when light is not blocked. If, for example, the position detection unit 46 is turned on when the power supply is turned on, the film holder carriage 41 is moved to the position at which the position detection unit 46 is turned off. The film holder carriage 41 is then moved from the position at which the OFF state is switched to the ON state by a distance corresponding to a predetermined number of driving pulses. The film holder carriage 41 is stopped at this position as a reset position.

This reset position serves as a reference position for each operation. The driving unit is controlled by driving pulses corresponding to film image input start and stop operations and film holder loading and unloading operations.

Figure 14:
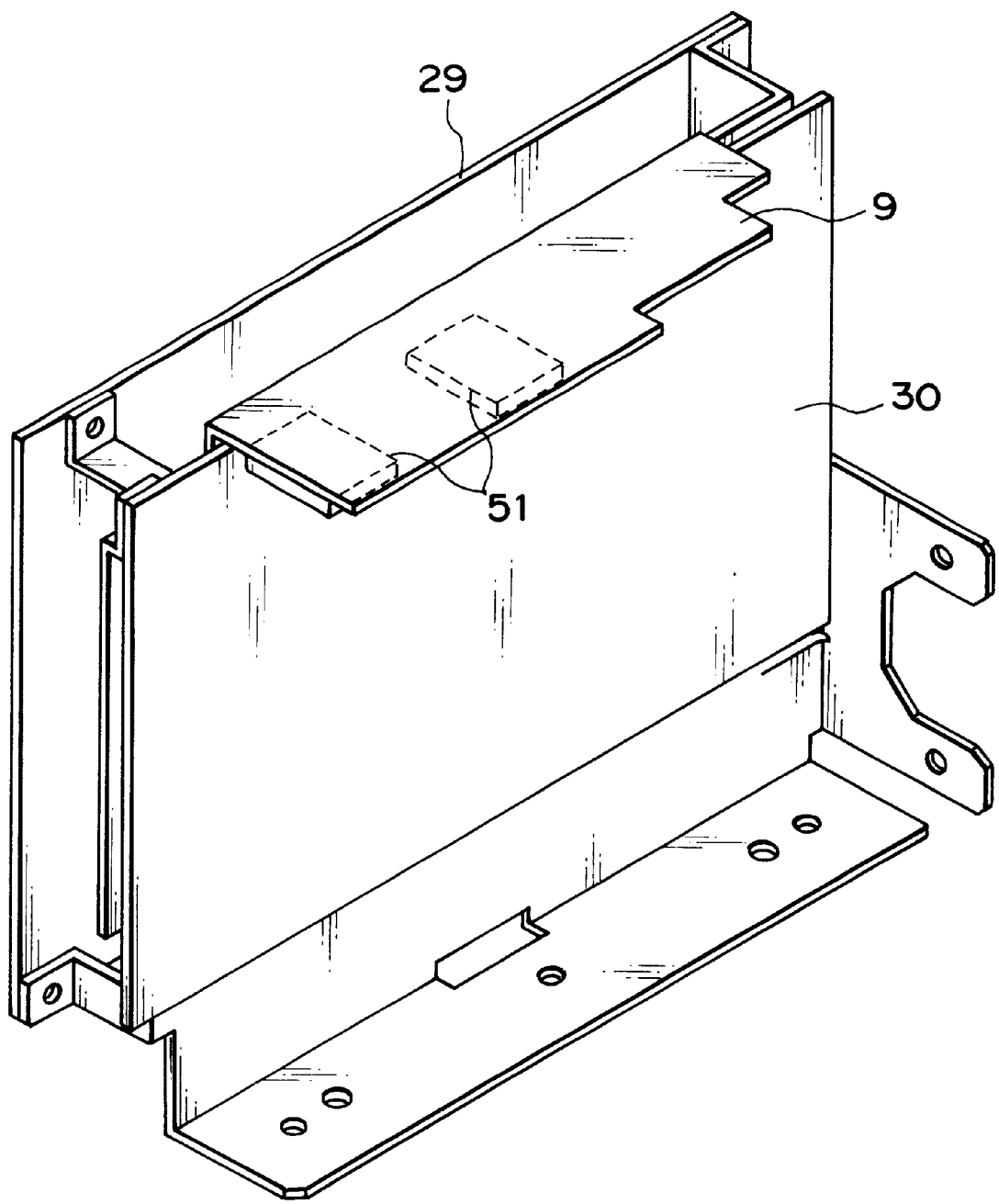
FIG. 14 is a perspective view showing a power supply board and a bracket in the film scanner according to the first embodiment.

FIG. 14 is a perspective view showing the power supply board 30 and the bracket 9.

As shown in FIG. 14, a rectifier, a transistor, and the like which are used to convert 100-V AC power into DC power are mounted on the power supply board 30. To efficiently dissipate the heat generated by these electric parts, the metal bracket 9 (metal plate) is connected to the power supply board 30, in place of a general radiation plate, to increase the effective area of the radiation plate. The stability of the power supply is improved by improving the heat dissipation effect. In addition, electric parts 51 that generate heat in large quantities, in particular, are arranged on the uppermost portion to be in direct contact with the bracket 9, thereby dissipating heat most efficiently.

Referring to FIG. 8, the film slide holder 27 is inserted through the insertion port in a side surface of the apparatus body. To realize a compact film scanner, the printed board 29 and the power supply board 30 are arranged to be parallel to each other. To make the most of this structure of the film scanner of this embodiment, the film slide holder 27 is inserted into the space between the printed board 29 and the power supply board 30.

This film slide holder 27 is an elongated member for storing a six-frame film, as described above. In some case, therefore, the film slide holder 27 may vibrate laterally in the film scanner to come into contact with the boards. In this embodiment, however, the metal bracket 9 is attached to the power supply board 30 of the film scanner, and a surface of the board with which the film slide holder 27 may come into contact is a smooth metal surface. Even if, therefore, the film slide holder 27 comes into contact with the board, the film is not damaged.

Figure 15:
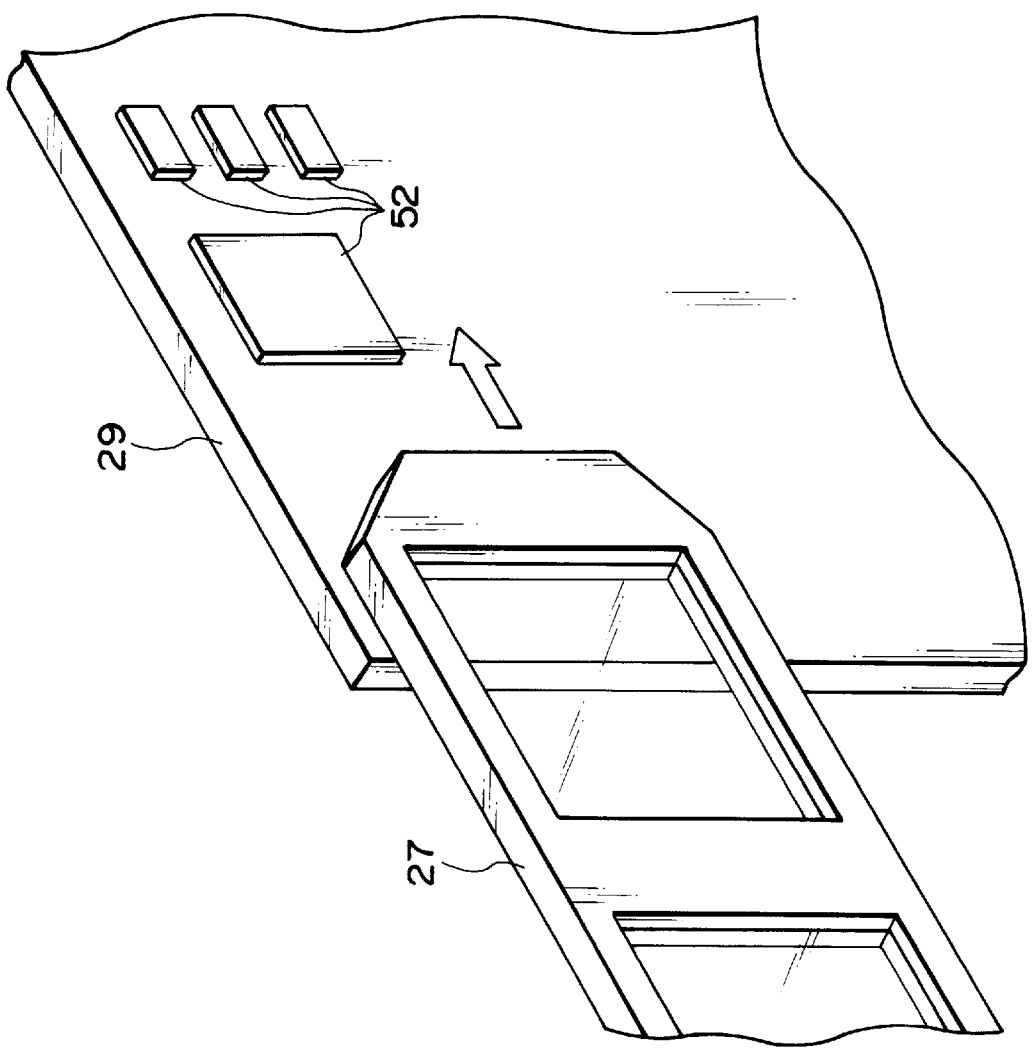
FIG. 15 is a perspective view showing the positional relationship between an image processing board and the film holder in the film scanner according to the first embodiment.

Various parts are mounted on the printed board 29. If, therefore, the film slide holder 27 comes into contact with the printed board 29, the film may be damaged. For this reason, in this embodiment, as shown in FIG. 15, only surface-mount parts 52 are mounted on a portion of the printed board 29 with which the film slide holder 27 may come into contact. By mounting the surface-mount parts, a sufficient space can be ensured between the printed board 29 and the power supply board 30, thereby greatly decreasing the possibility that the film slide holder 27 comes into contact with each board when the film slide holder 27 vibrates laterally. Even if the film slide holder 27 comes into contact with the printed board 29, the possibility of film damage is greatly decreased.

Since the parts of a central processing unit for performing image processing on the printed board 29 are susceptible to heat, even if they are surface-mount parts, they are mounted on the opposite surface of the printed board 29 to the power supply board 30, i.e., the surface of the printed board 29 on the outside of the apparatus, to separate the printed board 29 from the power supply board 30 and the bracket 9. With this arrangement, the above parts are made less susceptible to the adverse influence of the heat generated by the power supply board 30.

Figure 16:
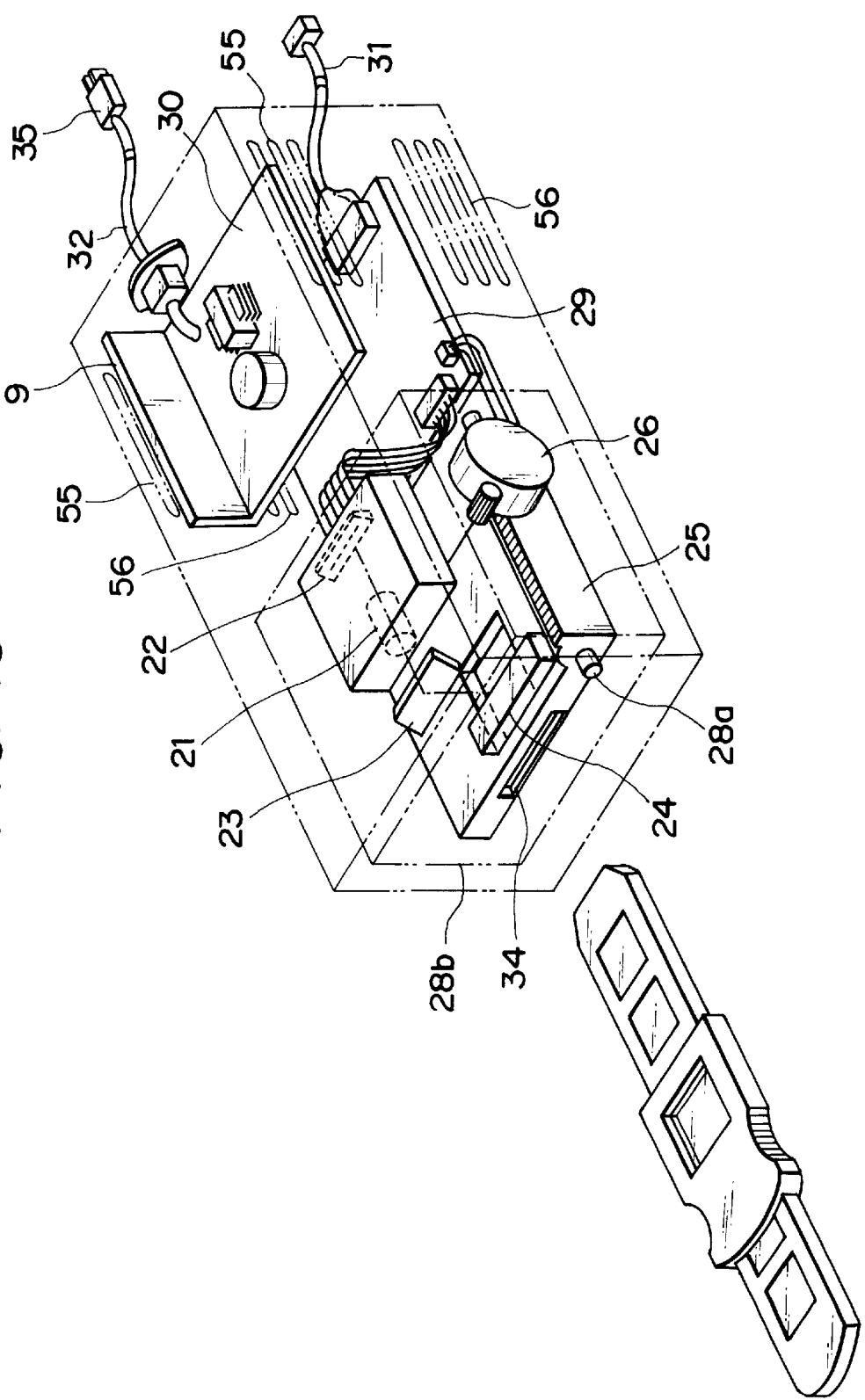
FIG. 16 is a perspective view showing the film scanner according to the first embodiment.

As shown in FIG. 16, the film scanner of this embodiment has outlets 55 for discharging air heated by the heating parts in the scanner to the outside and inlets 56 for introducing outer cooling air into the scanner. The air heated in the scanner is discharged outside from the outlets 55, and at the same time, outer air is introduced through the inlets 56, thereby preventing a rise in temperature around the film and the signal processing board.

Figure 17:
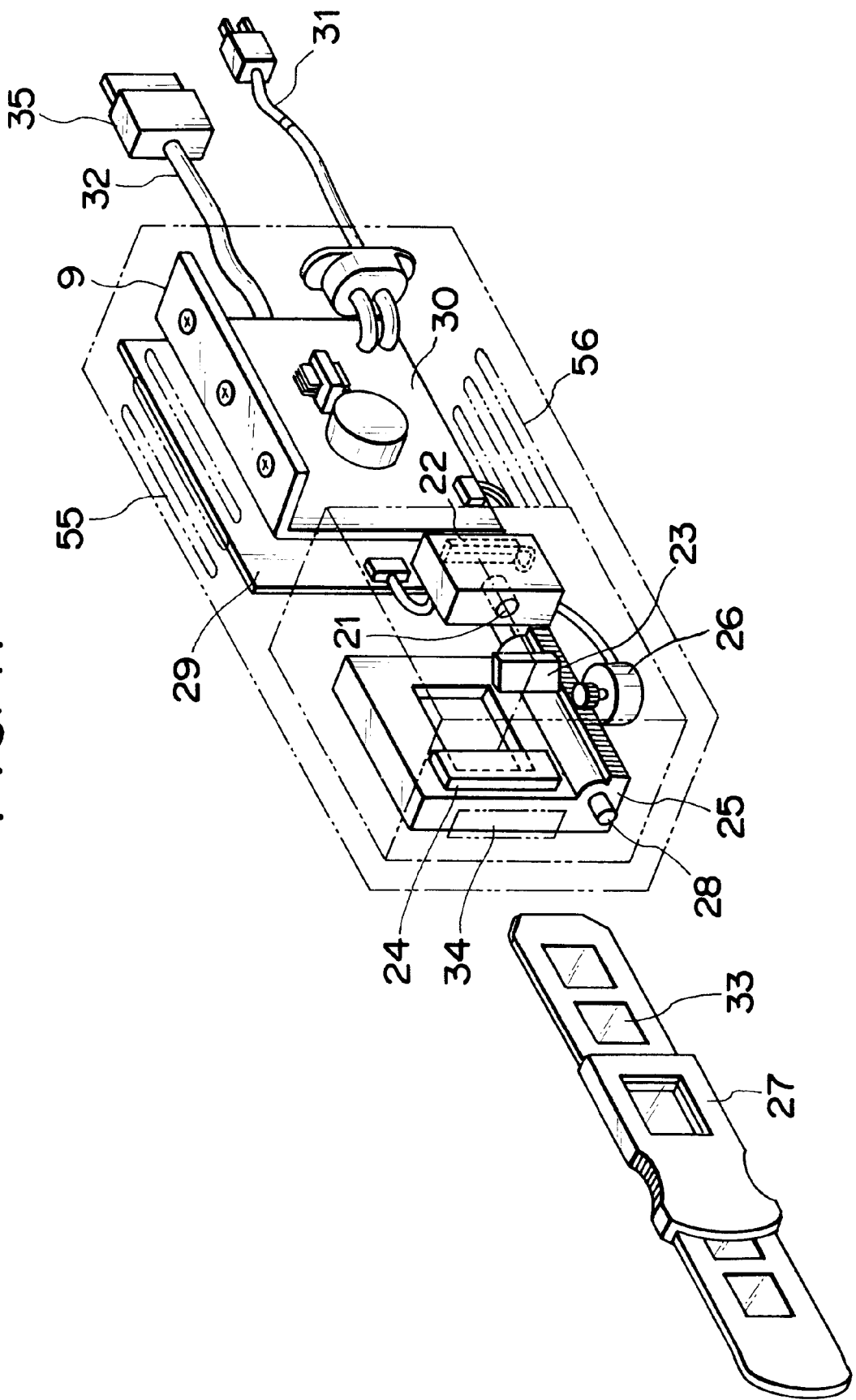
FIG. 17 is a perspective view showing the film scanner according to the first embodiment.

FIG. 17 shows a state in which the film scanner in FIG. 16 is rotated through 90°. As shown in FIG. 17, the outlets 55 and the inlets 56 are vertically formed in the space between the power supply board 30 and the printed board 29. The air taken through the inlets 56 passes through the space between the printed board 29 and the power supply board 30 to be guided to the outlets 55, thereby realizing more efficient heat dissipation. As described above, in this film scanner, heat dissipation can be performed satisfactorily without using any fan.

Figure 18:
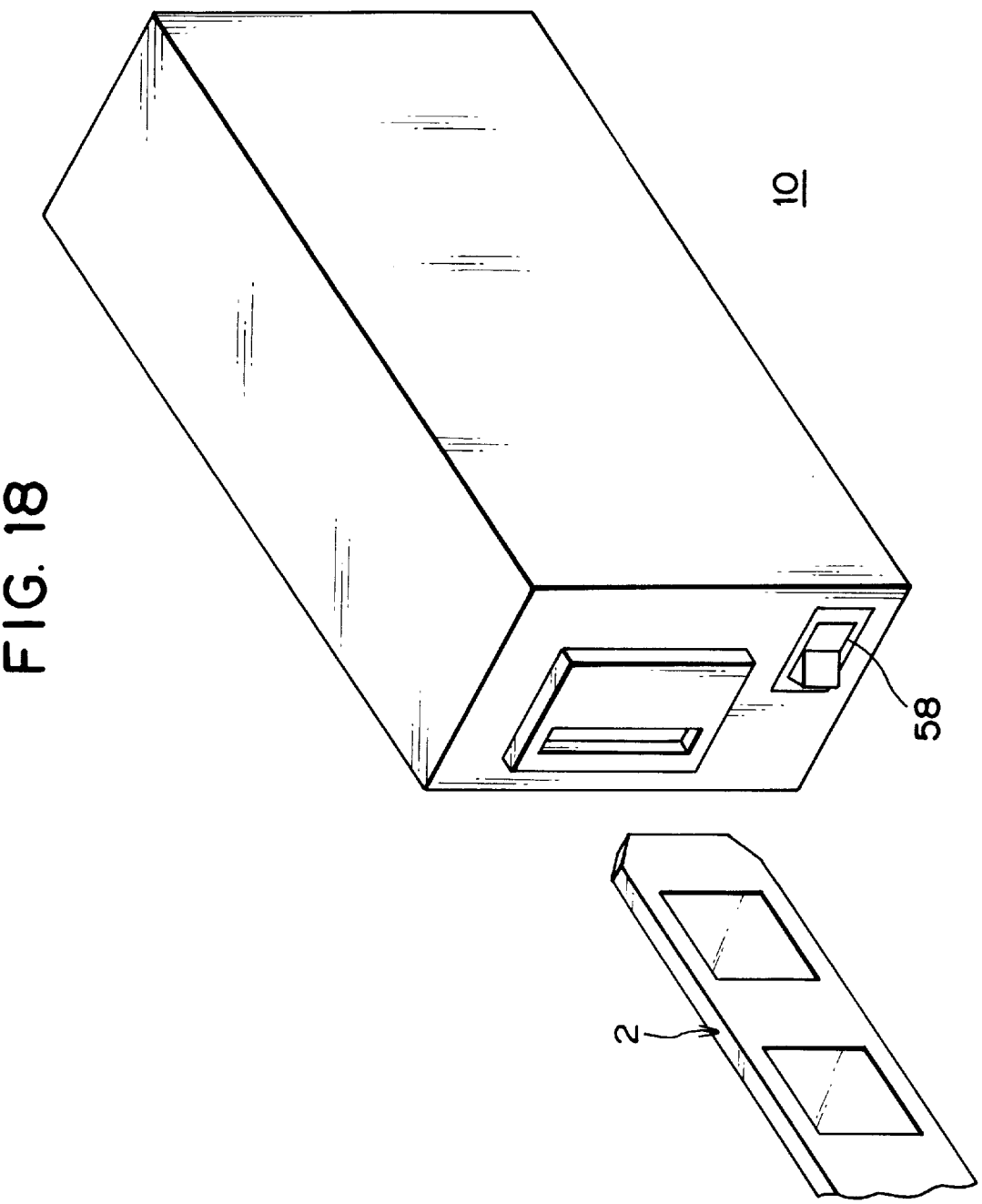
FIG. 18 is a perspective view showing the outer appearance of the film scanner according to the first embodiment.
Figure 19:
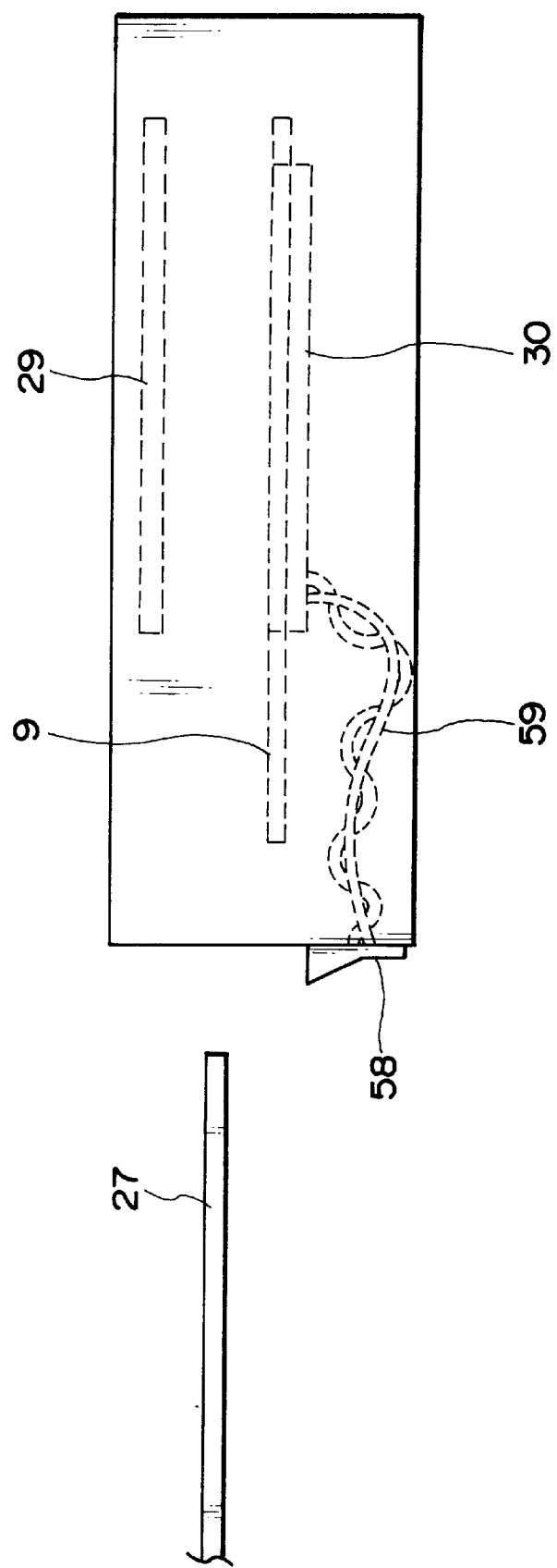
FIG. 19 is a top view showing the film scanner according to the first embodiment.
Figure 20:
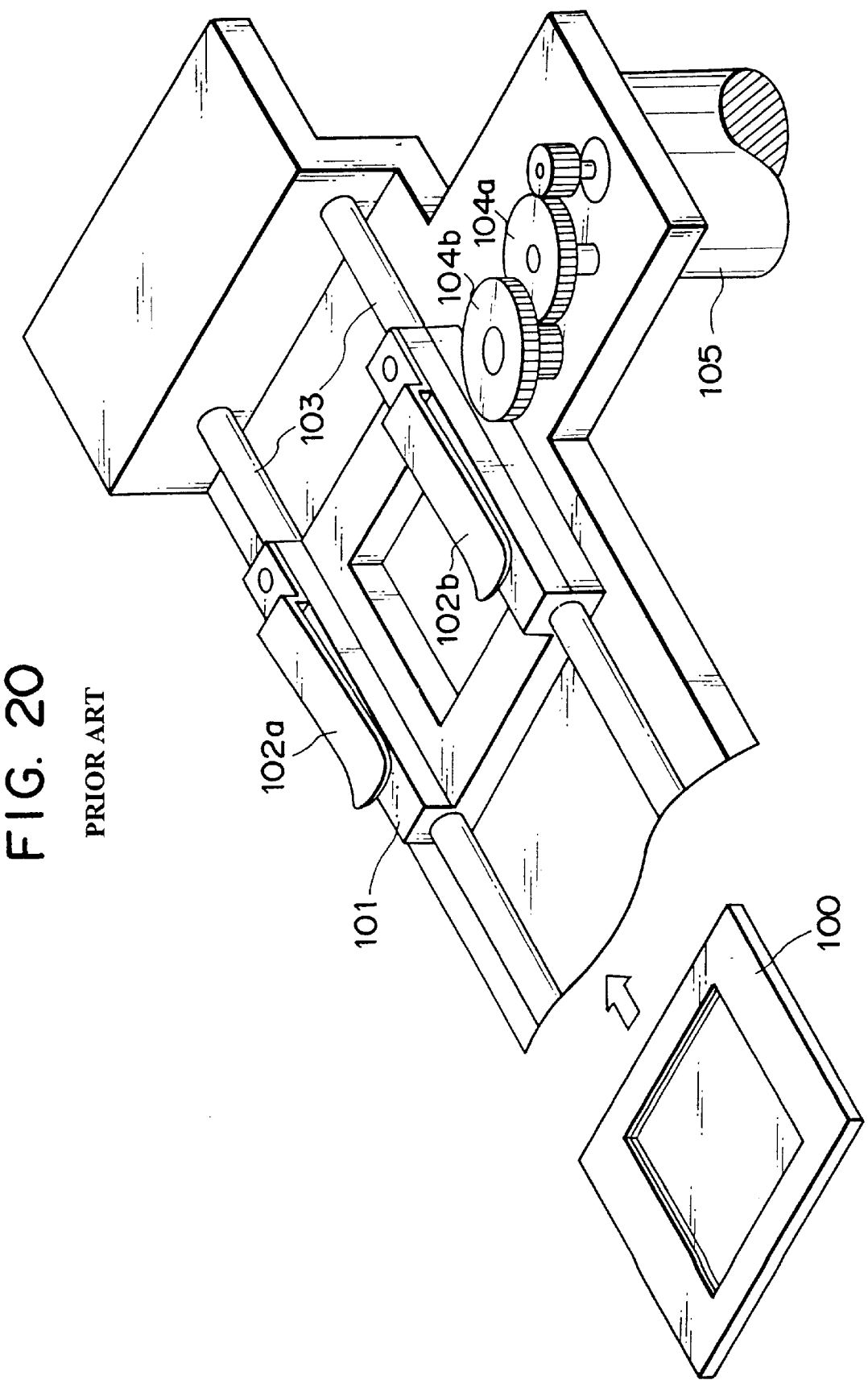
FIG. 20 is a perspective view showing the internal structure of a conventional film scanner.

Furthermore, in this embodiment, a power switch 58 of a film scanner 10 is placed on the front surface with respect to the operator, i.e., the film holder insertion surface, as shown in FIG. 18, to allow the operator to easily operate the switch. FIG. 19 is a top view of the film scanner in FIG. 18, showing the interior of the film scanner having the switch (switch means) on its front surface.

The printed board 29 and the power supply board 30 are arranged, avoiding the optical system of the film scanner, i.e., the cold cathode-ray tube 24, the mirror 23, the imaging optical system 21, and the photoelectric conversion element 21. In addition, a connector for sending an image signal to a computer or the like as an external device is placed on the rear portion of the film scanner body.

For this arrangement, as shown in FIG. 19, a connection cable 59 for connecting the power switch 58 to the power supply board 30 extends in the scanner body. When the power supply is turned on/off, power supply noise is generated from the connection cable 59. This noise is likely to adversely affect the printed board 29.

The metal bracket 9 is attached to the power supply board 30. The metal bracket 9 is grounded to also serve as an electromagnetic shield.

In this case, the connection cable 59 extends along the opposite side of the metal bracket 9 to the printed board 29 to be connected to the power switch 58. With this structure, the metal bracket 9 serves as a shield against the electromagnetic noise generated from the connection cable 59 to prevent the noise from adversely affecting the printed board 29.

As described above, the film holder of this embodiment, which is detachably mounted on the film scanner, includes a film holder which holds a film and has a plurality of opening portions corresponding to images on the film and a retreat portion, and a holder slider which has at least one opening portion to which an image on the film is exposed while the opening portion overlaps an opening portion formed in the film holder, and holds the film holder to be movable in the longitudinal direction. The film holder is designed to be opened/closed in the longitudinal direction while the holder slider is placed on the retreat portion. With this arrangement, the user can easily hold even a curled film in the film holder without contaminating the film. In addition, a plurality of frames of the film held in the film holder can be consecutively read.

The film scanner of this embodiment includes a film holder carriage for holding a film holder holding a film, a moving means for moving the film holder carriage, and a housing incorporating the film holder carriage and the moving means. When the moving means is to move the film holder carriage, a portion of the film holder carriage is slidably clamped/positioned by the housing, and the other portion of the carriage is slidably positioned by a guide shaft. With this structure, the number of parts can be decreased, and hence a decrease in the size of the product and an increase in the degree of freedom in design can be attained.

The film scanner of this embodiment includes an image sensing optical system for sensing an original image, an image processing circuit board on which an image processing circuit for performing predetermined processing for the image signal output from the image sensing optical system is mounted, and a power supply board on which a power supply circuit for supplying power to the image processing circuit is mounted. In this structure, the image processing circuit board and the power supply board are arranged to be parallel to each other, and a metal plate is placed between the boards. With this structure, the heat dissipation efficiency of the power supply board and the electromagnetic shield are improved to make the image processing circuit less susceptible to the adverse influence of the heat generated by the power supply and the power supply noise. As a result, the reliability of the power supply and arithmetic processing can be improved. In addition, the influence of heat on an original can be reduced.

[Second Embodiment]

A case in which a vibration absorbing unit is attached to a film scanner of the second embodiment will be described with reference to FIGS. 21 to 23.

Figure 21:
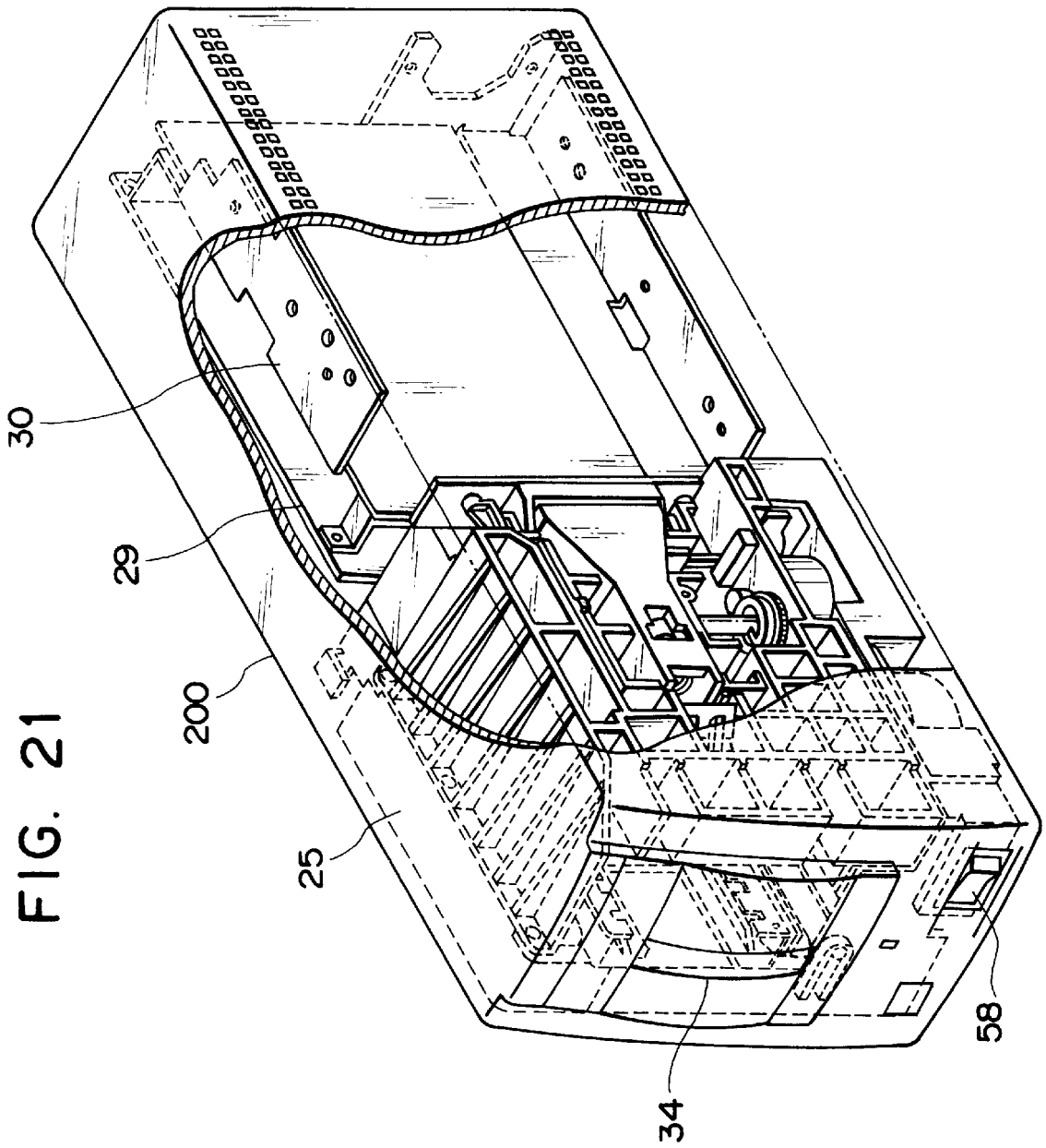
FIG. 21 is a perspective view showing the overall structure of a film scanner according to the second embodiment of the present invention.

FIG. 21 is a perspective view showing the film canner of this embodiment. FIG. 22 shows the vibration absorbing unit applied to the film scanner of the embodiment. FIG. 23 is a perspective view of the interior of the unit in FIG. 22.

Referring to FIG. 21, reference numeral 34 denotes an insertion port through which a film slide holder holding a film is inserted; 58, a power switch for turning on/off the power supply for the device; 25, a film holder carriage body for moving the film slide holder to read an image; 30, a power supply board for rectifying external AC power and supplying the power to the internal circuits; 29, a printed board for communicating with a film holder carriage control device, an image processing device, and an external device; and 200, an outer cover as an outer appearance protecting member.

Figure 22:
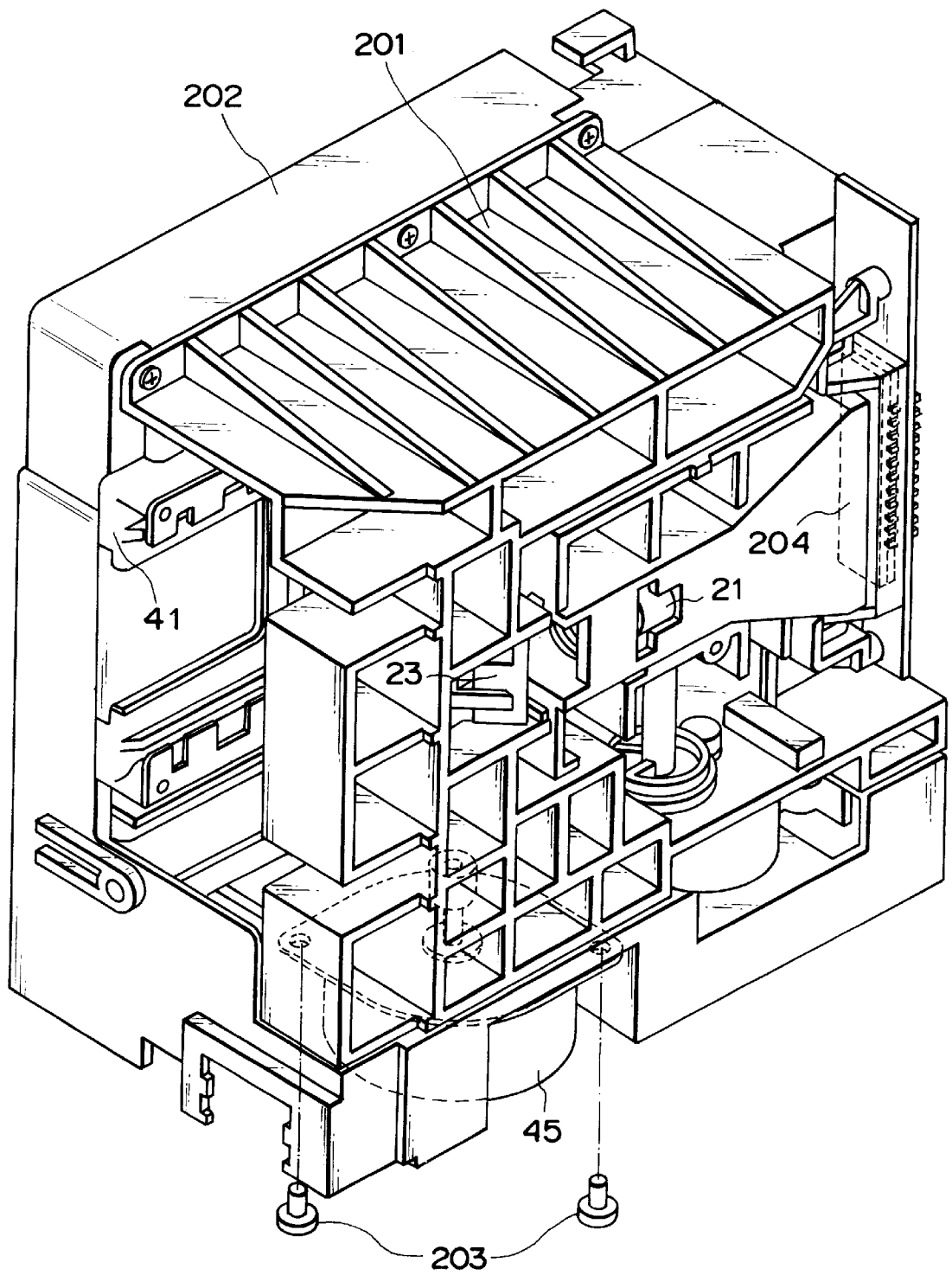
FIG. 22 is a perspective view showing a scanner unit according to the second embodiment.

Referring to FIG. 22, reference numeral 201 denotes a second housing for holding optical system parts; 202, a first housing which holds a film holder carriage 41 and a light source (cold cathode tube) and is fitted to the second housing 201 to hold a driving force transmission unit; 45, a stepping motor for driving the film holder carriage; 41, a film holder carriage which holds the film slide holder and serves as a stage capable of moving across the optical system; and 203, screws for fixing the driving unit 45 to the first housing.

Figure 23:
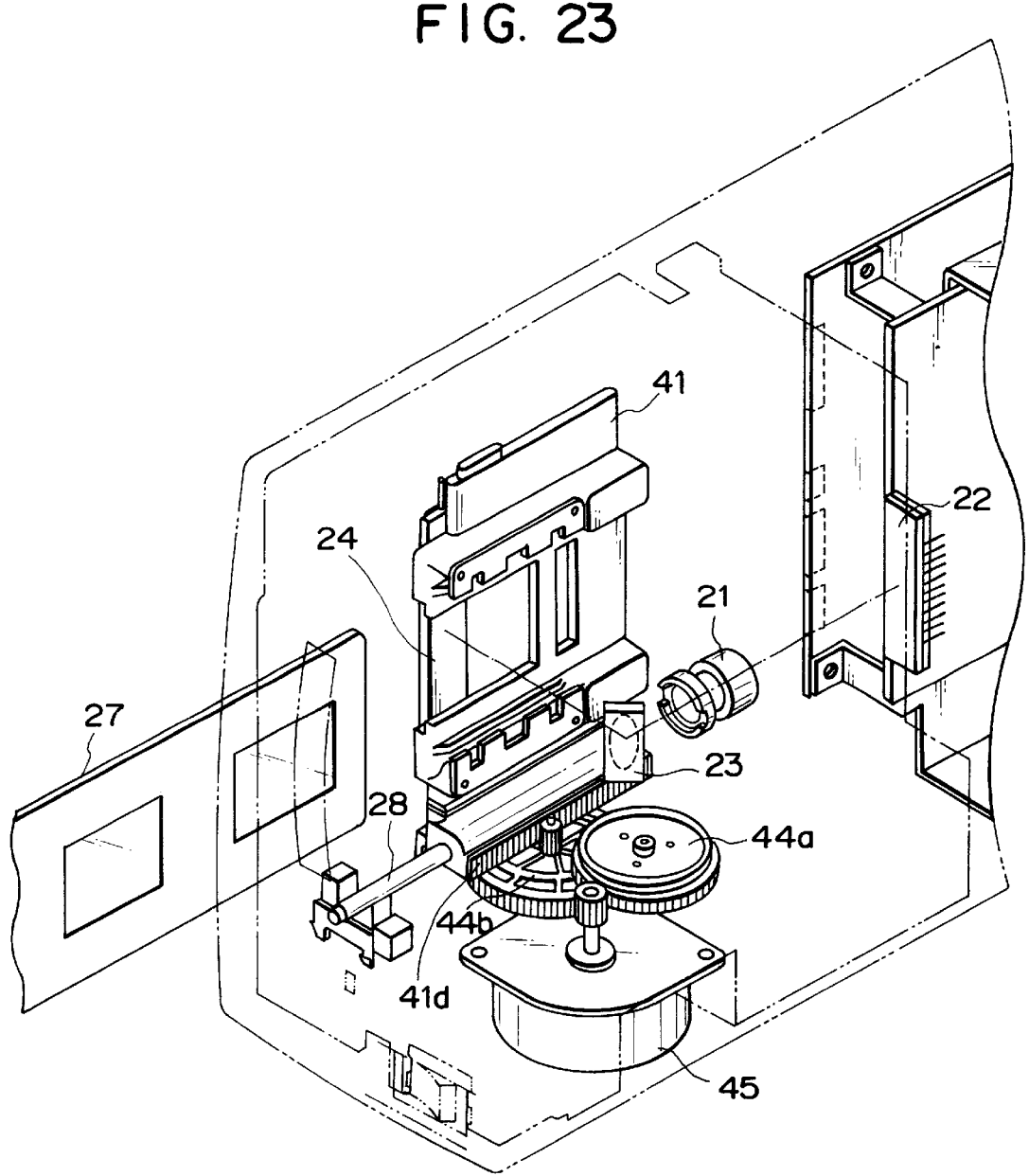
FIG. 23 is a perspective view showing the film scanner according to the second embodiment.

Referring to FIG. 23, reference numeral 21 denotes a lens for forming a film image on a CCD sensor 22; 44a, a reduction gear (transmission means) for reducing the rotation of the driving unit 45; 44b, an output gear (transmission means) such as a pinion gear for linearly moving the film holder carriage 41 with the rotation transmitted from the reduction gear 44a; 28, a guide shaft (guide means) for linearly guiding the film holder carriage 41; 24, a cold cathode tube for illuminating a film; 22, a line CCD sensor as an image sensing element (reading means) for photoelectrically converting the film image formed by the lens 21; 27, a film slide holder for holding a slide mount or a six-frame film; and 23, a mirror for bending the optical axis of the lens 21 through 90°.

The film scanner of this embodiment has the structure shown in FIG. 21. In this apparatus, the driving force transmission unit, the film holder carriage, and the like are arranged on the front side, and the board and the like are arranged on the rear side. As shown in FIG. 22, the second housing 201 has a frame structure having box-like reinforcing ribs and opens on the upper surface side of the drawing. The second housing 201 is formed by resin molding. The lens 21, the CCD sensor 22, and the mirror 23 are fixed to the second housing 201. The second housing 201 is fixed to the first housing 202.

The operation of the film scanner of this embodiment will be described next. When the driving unit 45 rotates, the output gear 44b rotates through the reduction gear 44a. The film holder carriage 41 has a rack gear 41d meshed with the output gear 44b, and linearly moves the film slide holder 27 back and forth along the guide shaft 28 while pressing/holding the film slide holder 27 with a biasing leaf spring.

In this embodiment, since the optical resolution is set to 2,720 DPI (Dot Per Inch), the width of a one-line film image read by the line CCD sensor 22 is about 9.33 μm. An image on an original film is read by being photoelectrically converted by the line CCD sensor 22 through the mirror 23 and the lens 21.

When a one-line image is completely read, the driving unit 45 rotates by four steps. The gear ratio is about 1:14.13, and the driving unit 45 which rotates by 1–2 phase drive is set to make one revolution by 192 steps. When, therefore, the driving unit 45 rotates by four steps, the film moves by 9.33 μm which is the distance corresponding to one line. In this case, the exposure time per line is 1/150 sec, and the driving unit 45 is driven at 600 PPS (Pulse Per Second) to synchronize with this timing. By repeating such an operation from the start to the end of the film, all the images on the film can be read eventually.

When the read resolution is to be changed to read an image with a resolution lower than the normal resolution, since the image is read while decimating lines, the driving frequency of the motor is increased to drive the motor at a high speed. At a resolution of 1,360 DPI, which is ½ the fundamental resolution, the motor is driven at 1,200 PPS. At a resolution of 680 DPI, which is ¼ the fundamental resolution, the motor is driven at 2,400 PPS.

In this case, the space capacity of the reinforcing rib portion provided for the second housing 201 changes with the distance from the driving unit 45; the capacity decreases with distance. In this embodiment, since a housing having a complex shape can be formed by resin molding, an optical system can be held by one part. A high-precision optical system can therefore be formed. In addition, since high strength can be maintained by the box-like reinforcing rib portion, a deterioration in read precision due to the influence of vibrations generated upon driving of the driving unit 45 can be prevented.

Since the capacity of the space enclosed with the reinforcing rib portion is not constant, even if the driving frequency of the driving unit 45 is changed in a wide range, resonance due to vibrations at a specific frequency can be prevented. Furthermore, drive noise leaking out from the insertion port of the film scanner can be reduced. Since the driving force transmission units can be gathered on the front side of the apparatus, the size of the apparatus can be reduced. As described above, since the capacity of the space enclosed with the rib portion decreases with distance from the driving unit 45, a portion through which larger driving vibrations are transmitted can have a higher strength.

[Third Embodiment]

A film scanner according to the third embodiment will be described below with reference to FIGS. 24 and 25.

The film scanner of the third embodiment is obtained by attaching a vibration absorbing unit to a flat bed type film scanner.

Figure 24:
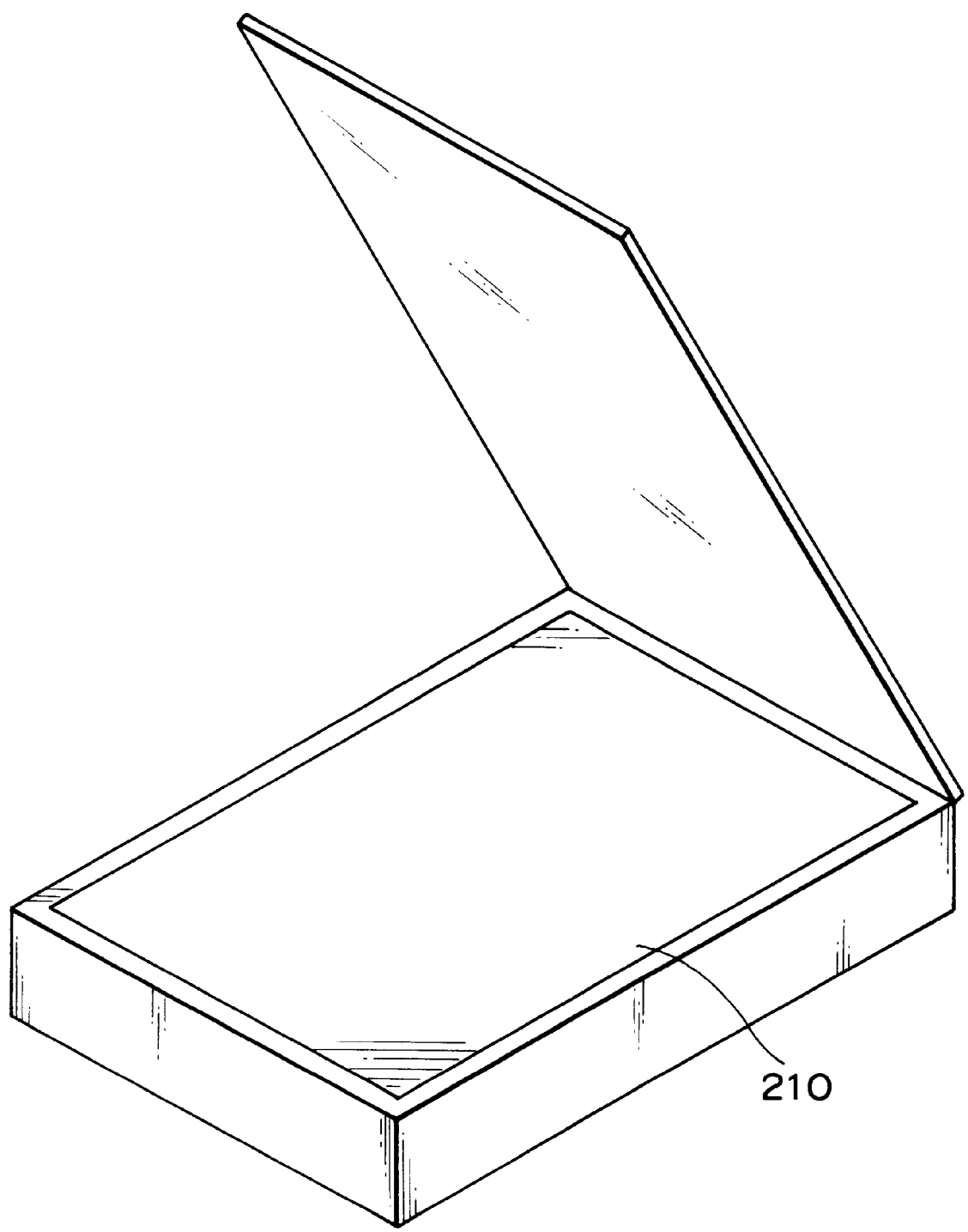
FIG. 24 is a perspective view showing the outer appearance of a film scanner according to the third embodiment of the present invention.

FIG. 24 is a perspective view of the film scanner of the third embodiment. Referring to FIG. 24, reference numeral 210 denotes an original table.

Figure 25:
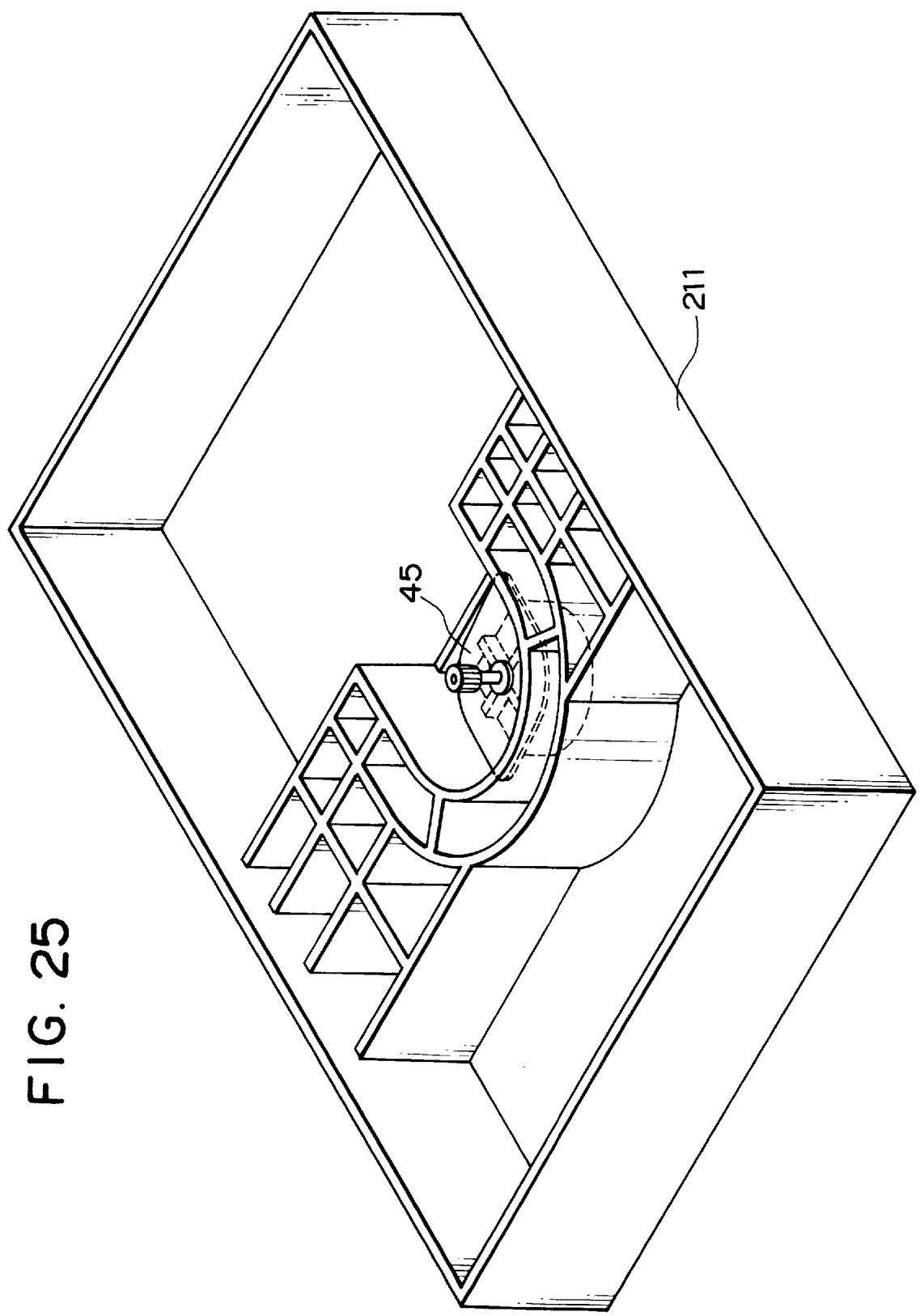
FIG. 25 is a perspective view showing the internal structure of the film scanner according to the third embodiment.

FIG. 25 shows the internal structure of the scanner in FIG. 24.

Referring to FIG. 25, reference numeral 211 denotes base member of a flat bed type scanner.

A driving unit 45 is fixed to the base member 211. As in the second embodiment, the base member 211 is formed by resin molding and has a box-like reinforcing rib portion having an opening on the upper surface side of the drawing. In the scanner of this embodiment, a light source and an optical system (neither of which are shown) are moved by the driving unit 45 to read a reflected image of a film image on the original table 210. With this scanner, the same effects as those of the second embodiment can be obtained.

As described above, according to this embodiment, the scanner includes the vibrator such as a stepping motor, and the housing to which the vibrator is fixed. In this structure, a plurality of frame structures are provided for the housing, and the respective spaces enclosed with the plurality of frame structures have different capacities. With this structure, an inexpensive, high-precision vibration absorbing unit can be provided. In addition, the influence of the transmission of vibrations generated by the vibrator and drive noise caused by resonance of the housing can be reduced.

[Fourth Embodiment]

Figure 26:
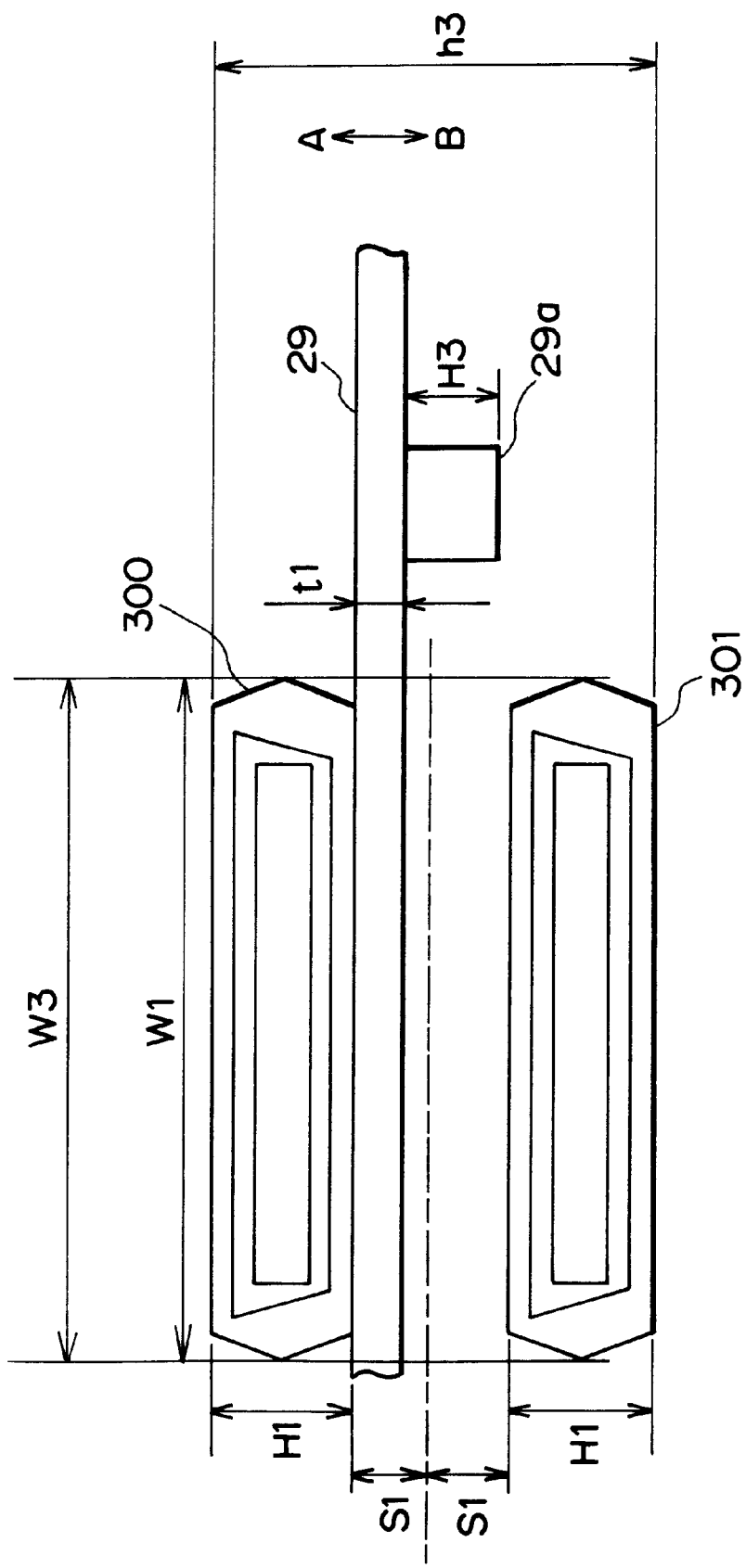
FIG. 26 is a view showing the arrangement of SCSI connectors according to the fourth embodiment of the present invention.

FIG. 26 shows an electronic device having a SCSI according to the fourth embodiment of the present invention.

The electronic device of this embodiment is, for example, a film scanner. In this scanner, a SCSI connector 300 is placed on a surface A of a printed board 29, and a SCSI connector 301 is placed on a surface B of the printed board 29. For the sake of descriptive convenience, the two SCSI connectors have the same outer dimensions.

Consider dimensional requirements on the surface B of the printed board 29 in FIG. 26. First of all, assume that the sum of a maximum height Hi of the SCSI connector 301 and a size twice a jutted size S1 of the fitting portion of a SCSI cable is larger than the sum of the thickness of the printed board 29 and the maximum height of an electronic part 29a, i.e., $$H1+S1\times2>t1+H3 \tag{5}$$

In this case, as shown in FIG. 26, a height h3 is given by $$h3=H1\times2+S1\times2 \tag{6}$$

From equations (4) and (6), we have $$\begin{aligned} h2 &= (H1\times2 + S1\times2) + t1 + H3 \\ &= h3 + (t1 + H3) > h3 \end{aligned} \tag{7}$$

Figure 33:
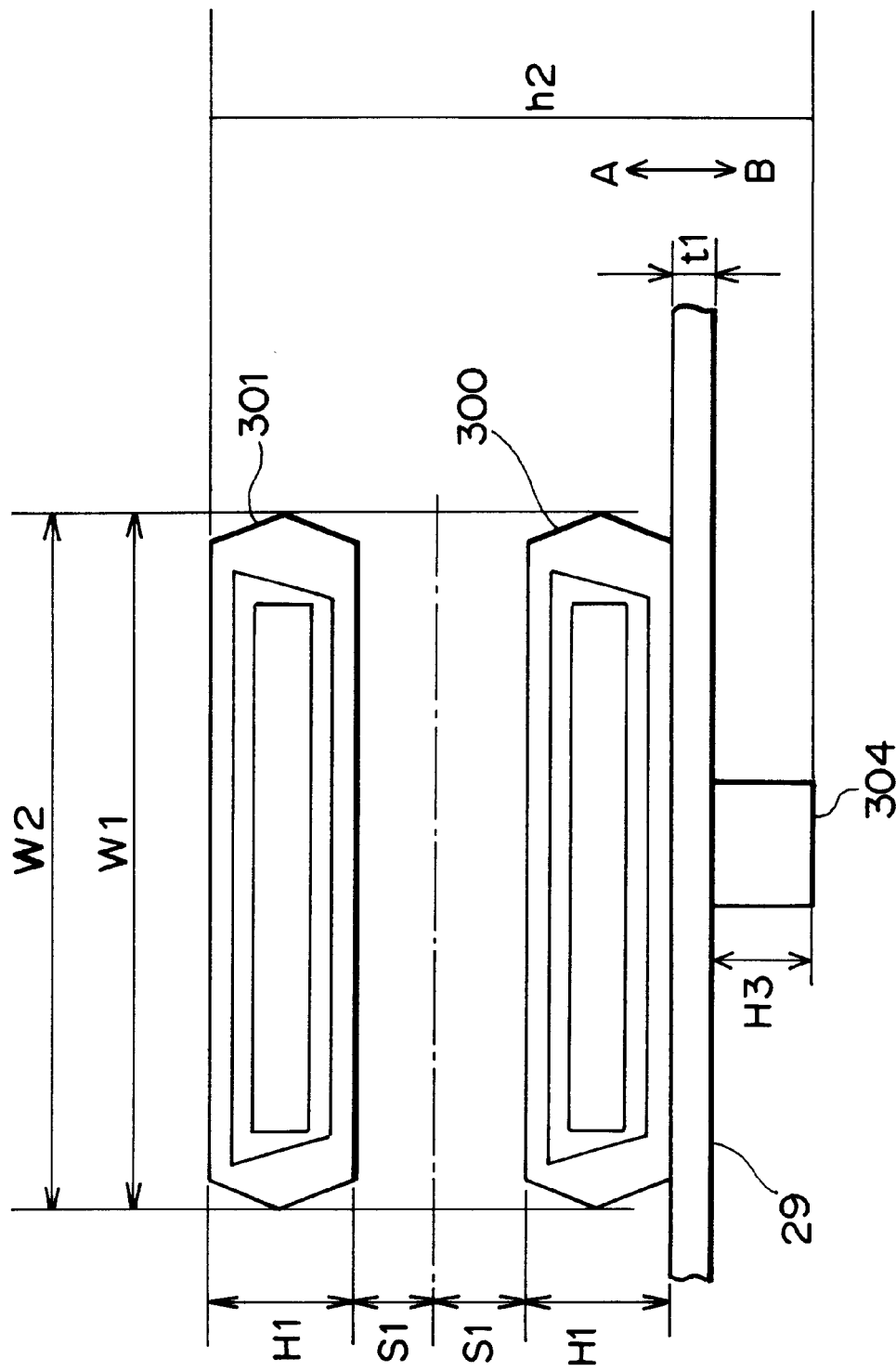
FIG. 33 is a view showing another conventional arrangement of SCSI connectors.

Obviously, the height h3 in this embodiment is smaller than the height h2 in the structure of the prior art in FIG. 33.

Consider dimensional requirements on the surface B of the printed board 29 again. Assume that the sum of the maximum height H1 of the SCSI connector 301 and the size twice the jutted size S1 of the fitting portion of the SCSI cable is larger than the sum of the thickness of the printed board 29 and the maximum height of the electronic part 29a, i.e., $$H1+S1\times2\leq t1+H3 \tag{8}$$

In this case, the maximum height on the surface B of the printed board 29 is determined by the electronic part 29a. From inequality (8), the height h3 is given by $$h3=H1+t1+H3 \tag{9}$$

From equations (4) and (9), we have $$\begin{aligned} h2 &= (H1 + t1 + H3) + H1 + S1\times2 \\ &= h3 + (H1 + S1\times2) > h3 \end{aligned} \tag{10}$$

Evidently, the height h3 in this embodiment is smaller than the height h2 in the prior art in FIG. 33.

Figure 27A:
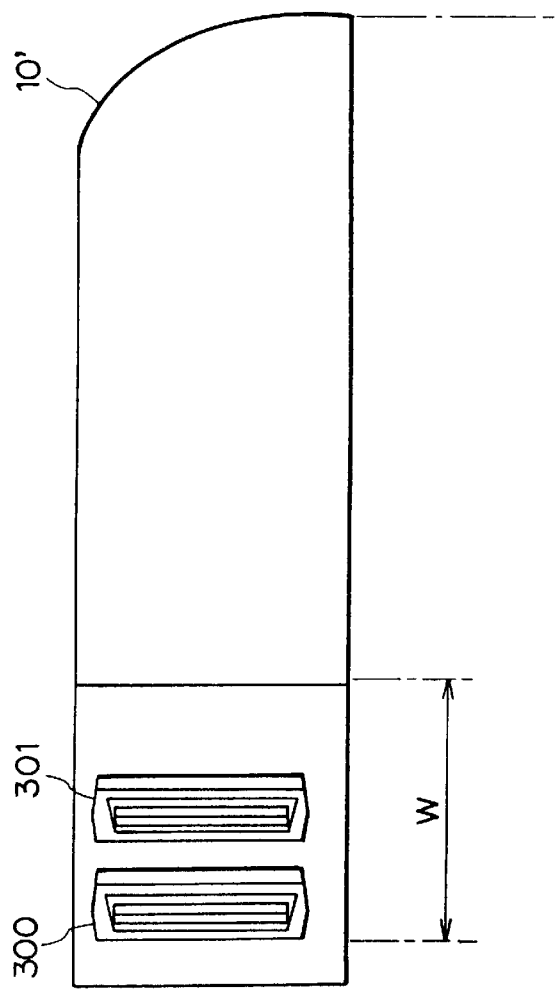
FIGS. 27A and 27B are views for explaining the outer dimensions of a film scanner according to the fourth embodiment.
Figure 27B:
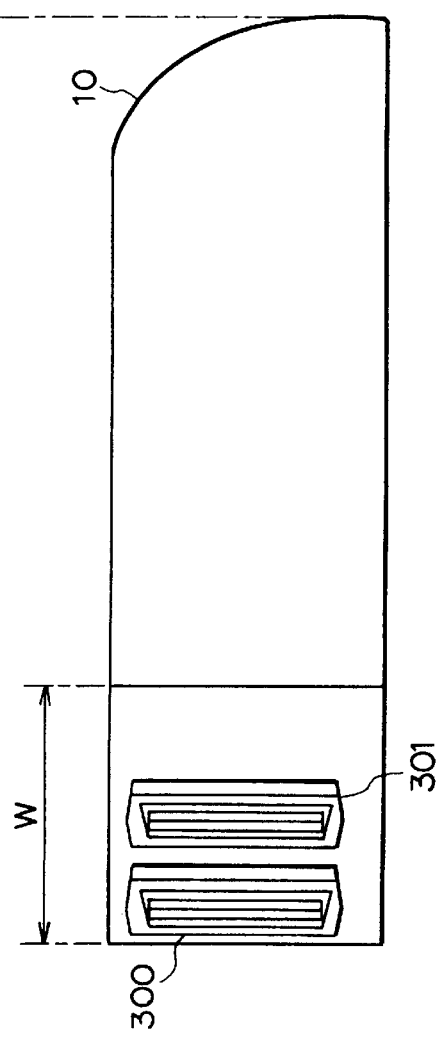

FIGS. 27A and 27B are views for explaining the difference between the outer appearance of a film scanner in which two SCSI connectors are placed on the upper and lower surfaces of a printed board and that of a film scanner in which two connectors are stacked on one surface of a printed board as in the prior art.

FIG. 27A shows the SCSI terminal mount surface of a film scanner 10' based on the conventional arrangement. FIG. 27B shows the SCSI terminal mount surface of a film scanner 10 according to this embodiment.

Referring to FIGS. 27A and 27B, reference symbol W denotes the difference in width between the film scanner 10' and the film scanner 10. As is apparent from FIGS. 27A and 27B, the film scanner 10 of this embodiment is more compact than the conventional film scanner 10'.

As described above, by arranging two SCSI connectors on the upper and lower surfaces of a printed board as in this embodiment, the outer dimensions of the product can be reduced. In this embodiment, the SCSI connectors 300 and 301 have the same outer dimensions. Even if, however, the present invention is applied to a structure in which the SCSI connectors 300 and 301 have different outer dimensions, the same effects as those described above can be obtained. Furthermore, the two SCSI connectors having the same outer dimensions are used according to the above description. However, the present invention can be applied to a structure having three or more SCSI connectors.

[Fifth Embodiment]

Figure 28:
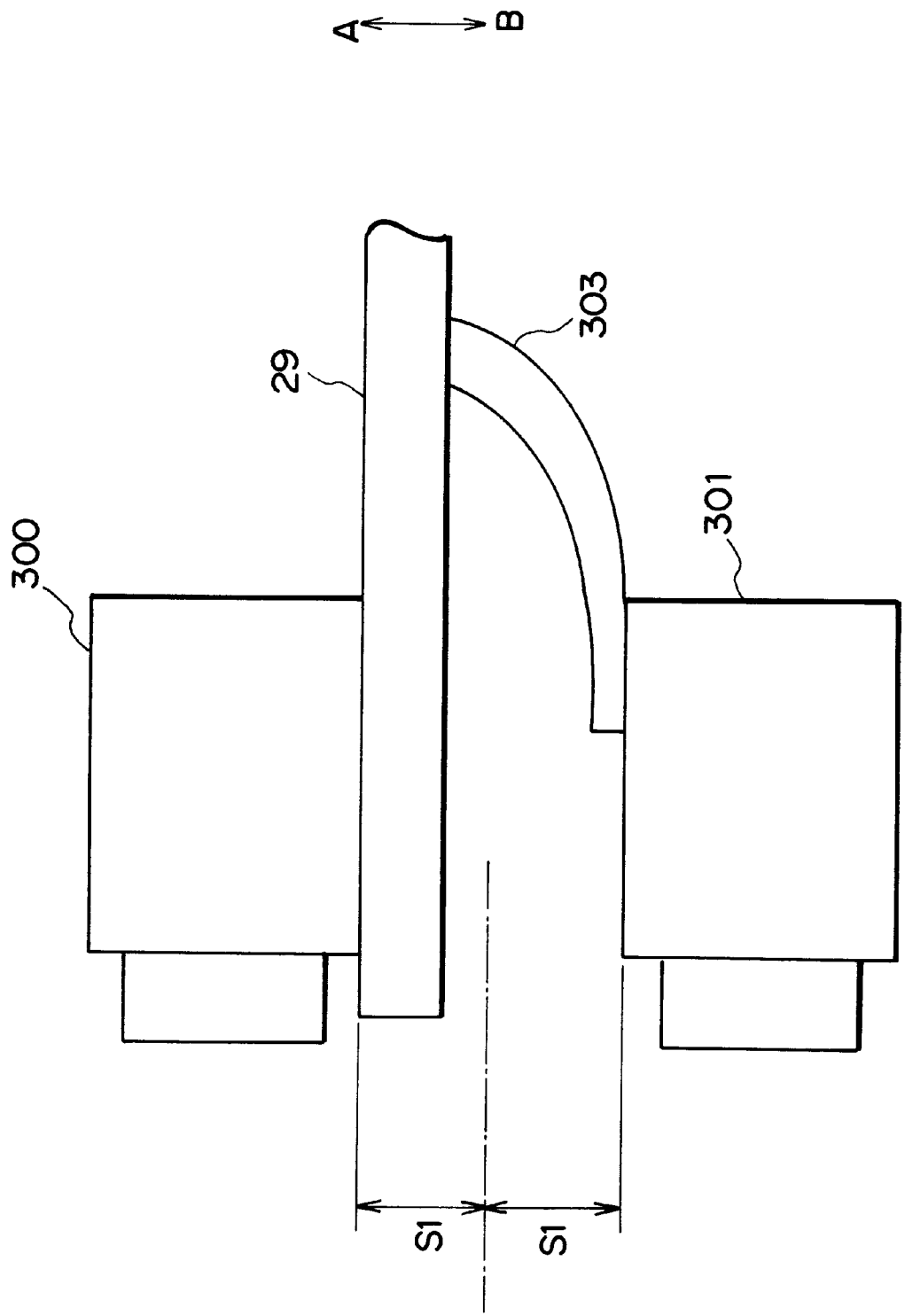
FIG. 28 is a view showing the connection between SCSI connectors and a printed board according to the fifth embodiment of the present invention.

FIG. 28 is a side view of the SCSI connector in FIG. 26 or 27.

As described above, a distance corresponding to the jutted size of the fitting portion of the SCSI cable to be connected must be ensured between a SCSI connector 300 and a SCSI connector 301. For this reason, the SCSI connector 301 cannot be directly mounted on a printed board 29. As shown in FIG. 28, the SCSI connector 301 is therefore electrically connected to the printed board 29 through an electric wire 303.

In this case, since a SCSI is constituted by a plurality of signal lines, the electric wire 303 is actually a bundle of a plurality of electric wires, and extends from a surface B of the printed board 29. The SCSI connector 300 is directly mounted on the printed board 29, and hence need not be connected by using such electric wires.

Figure 29:
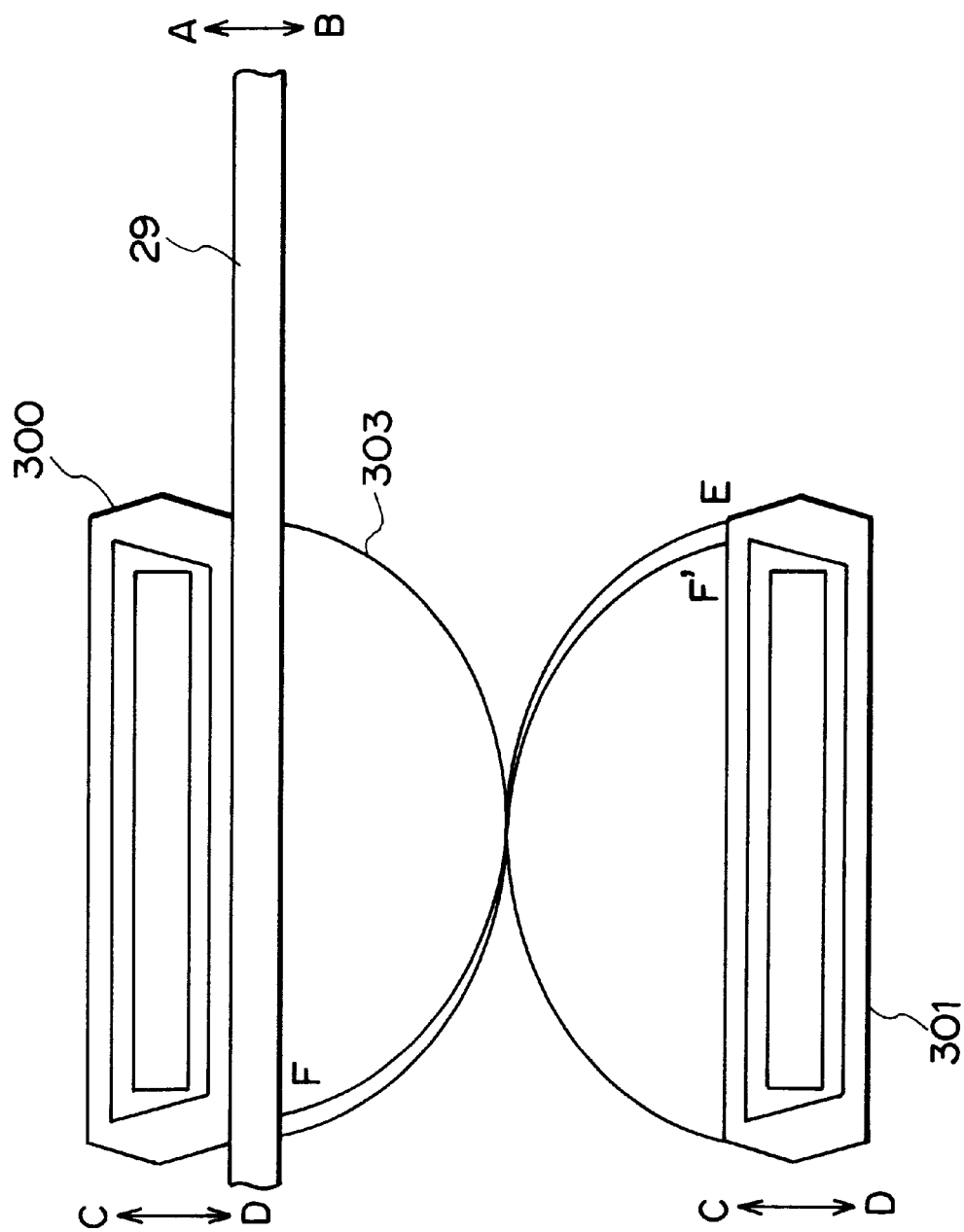
FIG. 29 is a view showing the connection between SCSI connectors and a printed board according to the fifth embodiment of the present invention.

Assume that the SCSI connectors 300 and 301 are oriented in the direction indicated by an arrow C in FIG. 29, and that the connection position on the printed board 29 at which the first signal line of the electric wire 303 is connected is represented by D, the connection position at which the first signal line is connected to the SCSI connector 301 is represented by E. Assume also that the two ends of the first signal line of the electric wire 303 are respectively represented by F and F'.

Referring to FIG. 29, the SCSI connectors 300 and 301 are oriented in the same direction, i.e., the direction indicated by the arrow C. That is, the two SCSI connectors are arranged such that their vertical positions coincide with each other. In consideration of the positional relationship between the SCSI connector 301 and the printed board 29, the first signal line of the electric wire 303 must be connected to the left side (D, F) of the connector 300 in the drawing, and to the right side of the connector 301 in the drawing, the electric wire 303 is connected after it is twisted. If, however, the electric wire 303 is twisted in this manner, a heavy physical load is imposed on the electric wire 303. Such a load may cause connection failure or disconnection, and signals may not be accurately input/output.

Figure 30:
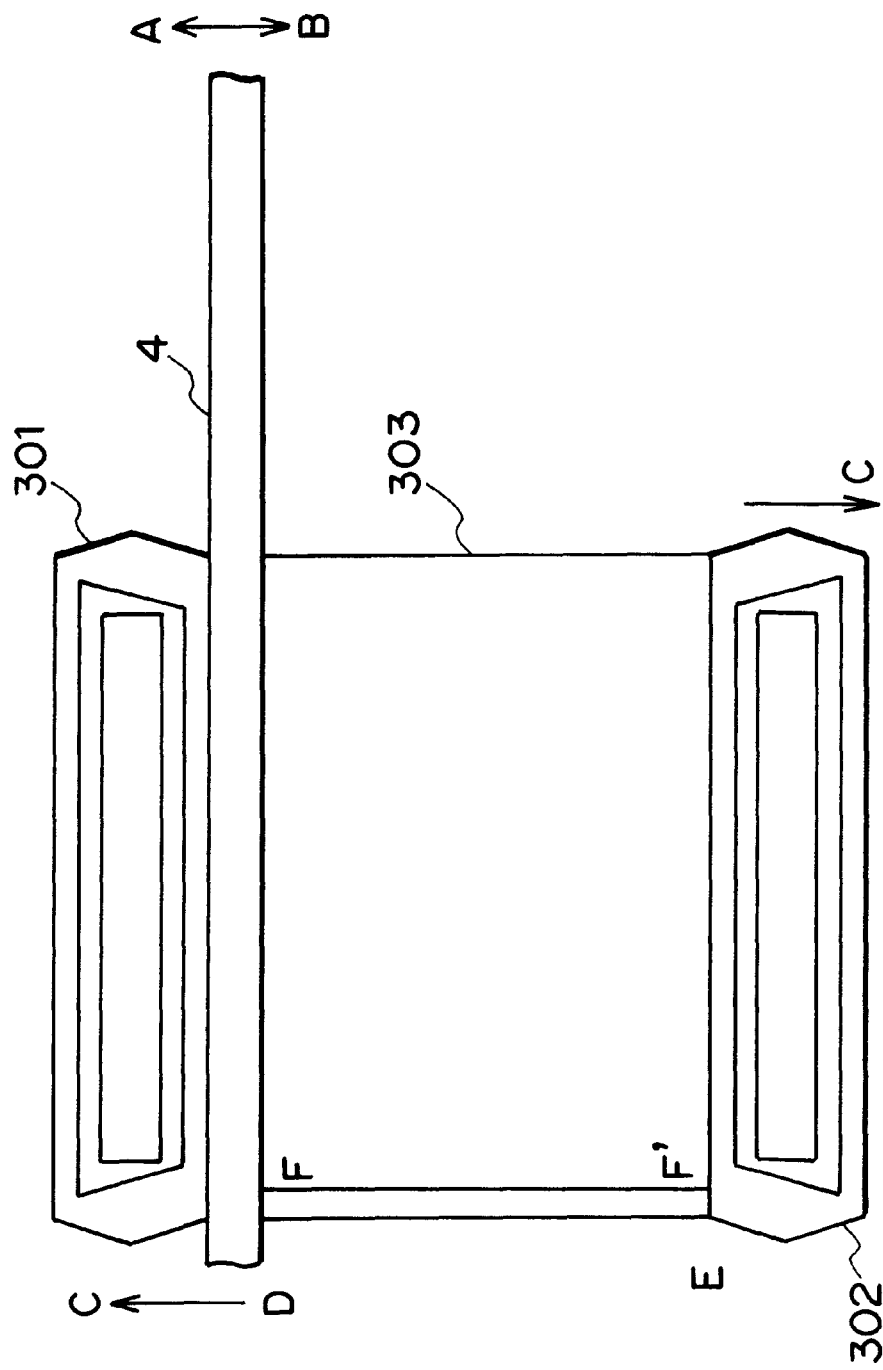
FIG. 30 is a view showing the connection between SCSI connectors and a printed board according to the fifth embodiment of the present invention.
Figure 31:
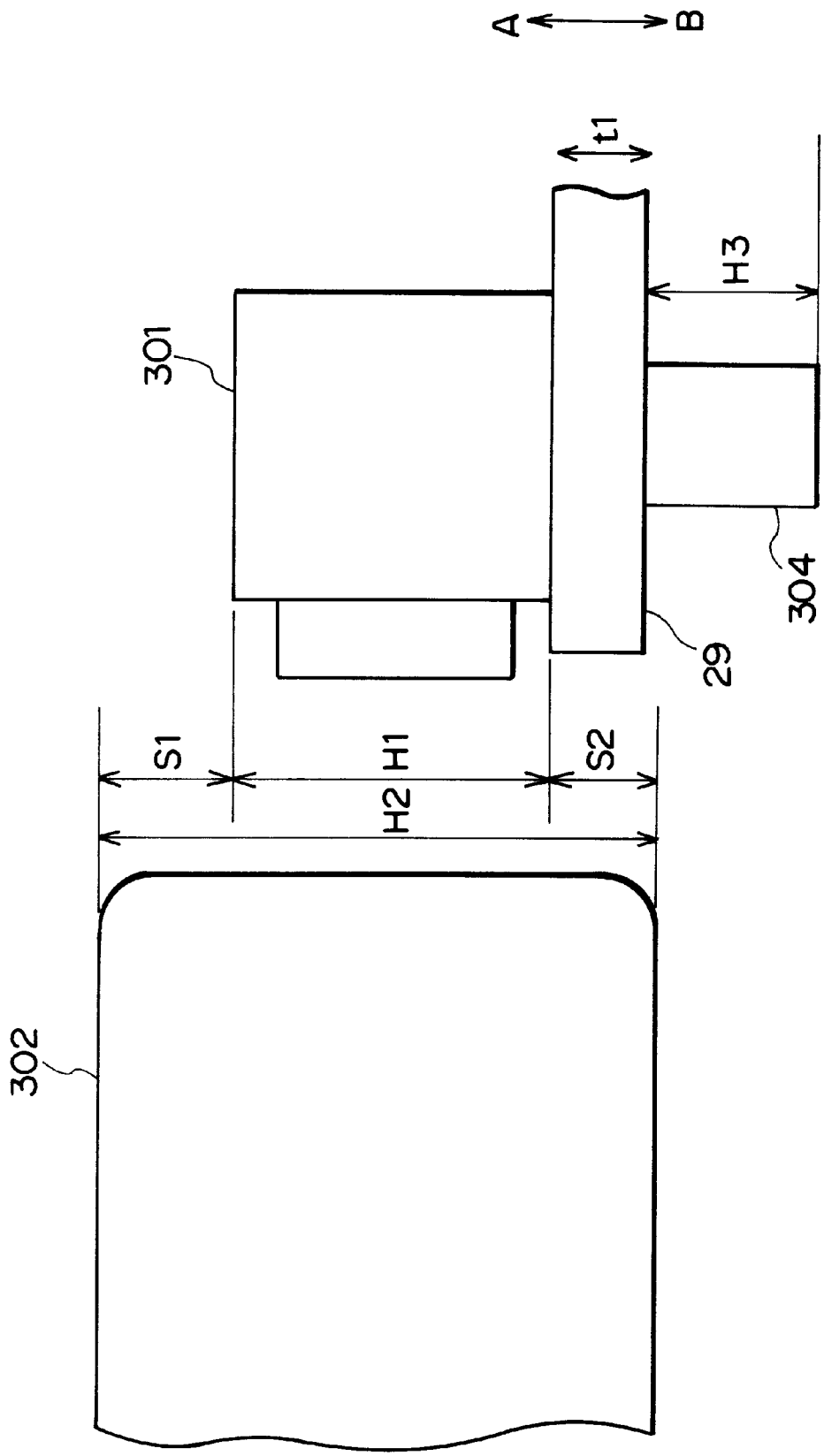
FIG. 31 is a view showing a SCSI connector and the fitting portion of a SCSI cable.
Figure 32:
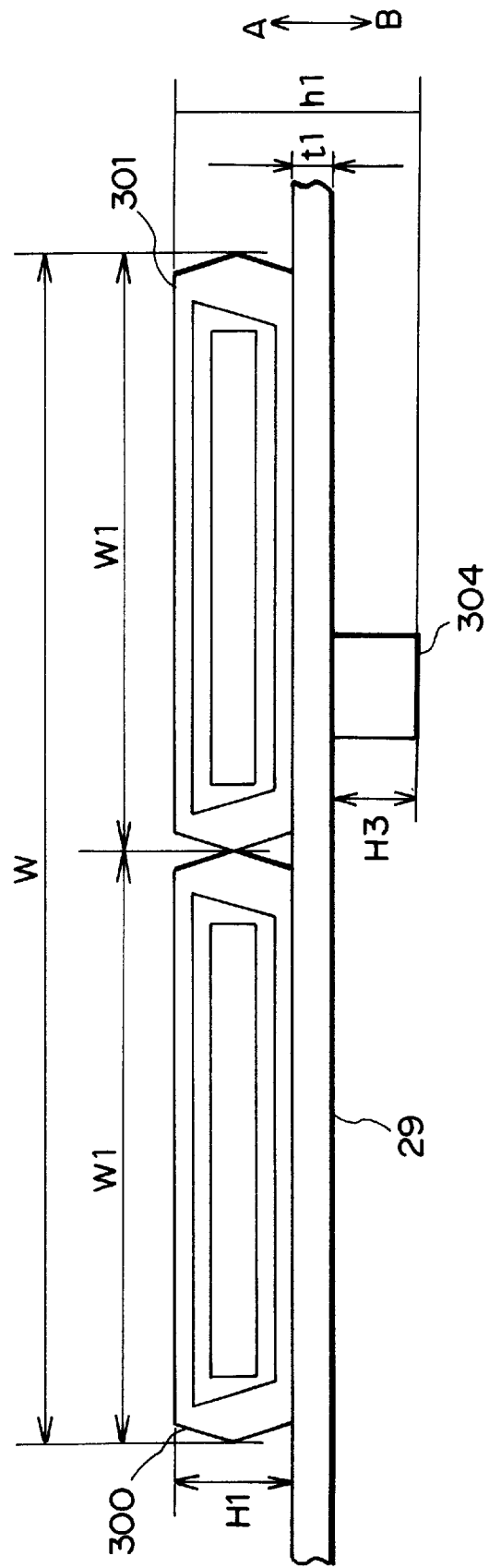
FIG. 32 is a view showing a conventional arrangement of SCSI connectors.

In this embodiment, therefore, as shown in FIG. 30, a SCSI connector 301 is oriented in the opposite direction to the direction of a SCSI connector 300, i.e., the direction indicated by an arrow C. With this arrangement of the connectors, the first signal line of the electric wire 303 can be connected to the left side of both the connectors 300 and 301 in the drawing.

The SCSI connectors are arranged such that lines connecting the contact points (D, F) at which the SCSI connector 301 is connected to the electric wires through the printed board and the contact points (E, F') at which the SCSI connector 302 are connected to the electric wires are straight lines extending in substantially the vertical direction when viewed from the terminal exposure surface side of each SCSI connector. With this arrangement, the electric wire 303 need not be twisted, and hence the printed board 29 and the SCSI connector 301 can be electrically connected to each other without imposing any physical load on the electric wire 303.

As has been described above, according to this embodiment, reductions in the outer dimensions of an electronic device having a SCSI and an improvement in reliability can be realized by devising the arrangement of SCSI terminals.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus comprising:

a carriage for holding a film holder holding a film;

moving means positioned proximate to second portion of said carriage, for moving said carriage; and a housing for holding said carriage and said moving means, wherein while said moving means moves said carriage, first portion of said carriage is positioned by being slidably clamped by said housing, and said second portion which is in the opposite side of said first portion of said carriage is slidably positioned by a guide shaft.

2. The apparatus according to claim 1, further comprising biasing means for biasing said carriage toward said guide shaft.

3. The apparatus according to claim 2, further comprising position detection means for detecting a position of said carriage.

4. The apparatus according to claim 1, further comprising position detection means for detecting a position of said carriage.

5. An image reading apparatus comprising:

image sensing means for sensing an image from an original;

convey means for conveying the original;

a first board on which an image processing circuit for performing predetermined processing for an image signal output from said image sensing means is mounted; and a second board on which a power supply circuit for supplying power to said image processing circuit is mounted, wherein said first and second boards are arranged to be parallel to each other, and said convey means conveys the original to cause the original to pass through a space enclosed with said first board and said second board.

6. The apparatus according to claim 5, wherein a heating member mounted on said second board is brought into direct contact with said second board.

7. The apparatus according to claim 5, wherein a surface-mount part is mounted on a surface of said first board which opposes said second board, an arithmetic processing unit is mounted on a surface of said first board which does not oppose said second board.

8. The apparatus according to claim 5, wherein switch means for cutting supply of power to said image processing circuit is placed on the same surface as a surface through which the original is inserted, and a cable for connecting said switch means to said power supply circuit is placed on a surface of said second board which opposes said second board.

9. The apparatus according to claim 5, further comprising an inlet for taking outer air, and an outlet for discharging heated air from said apparatus.

10. The apparatus according to claim 9, wherein the inlet is formed in a lower part of a space enclosed with said first board and said second board, and the outlet is formed in an upper part of the space.

11. The apparatus according to claim 5, further comprising convey means for conveying the original, and wherein said convey means conveys the original to cause the original to pass through the space enclosed with said first board and said second board.

12. The apparatus according to claim 5, wherein said convey means conveys the original while keeping the original parallel to said first or second board.

13. The apparatus according to claim 5, wherein the original is a translucent original.

* * * * *

UNITED STATES PATENT AND TRADEMARK OFFICE
CERTIFICATE OF CORRECTION

PATENT NO. : 6,175,406 B1
DATED : January 16, 2001
INVENTOR(S) : Toshimi Lizuka et al.

It is certified that error appears in the above-identified patent and that said Letters Patent is hereby corrected as shown below:

Column 3,
Line 30, "hi" should read -- h1 --

Column 6,
Line 45, "id" should read -- 1d --

Column 12,
Line 1, "canner" should read -- scanner --

Column 13,
Line 49, "denotes base" should read -- denotes a base --

Column 14,
Line 15, "Hi" should read -- H1 --

Signed and Sealed this

Eighteenth Day of June, 2002

Attest:

JAMES E. ROGAN
Attesting Officer
Director of the United States Patent and Trademark Office